(12) United States Patent
Tezuka et al.

(10) Patent No.: US 6,792,002 B2
(45) Date of Patent: Sep. 14, 2004

(54) PACKET TRANSFER SYSTEM

(75) Inventors: Yasuo Tezuka, Kawasaki (JP); Hideo Abe, Yokohama (JP); Tetsuo Yamaguchi, Yokohama (JP); Takeshi Harada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 792 days.

(21) Appl. No.: 09/775,130

(22) Filed: Feb. 1, 2001

(65) Prior Publication Data

US 2001/0014105 A1 Aug. 16, 2001

(30) Foreign Application Priority Data

Feb. 14, 2000  (JP) ........................................ 2000-035294

(51) Int. Cl.[7] .............................................. H04L 12/56
(52) U.S. Cl. .................................... 370/474; 370/395.1
(58) Field of Search .............................. 370/395.1, 474, 370/469, 395.6

(56) References Cited

U.S. PATENT DOCUMENTS

| | | | | |
|---|---|---|---|---|
| 5,408,469 A | * | 4/1995 | Opher et al. | 370/399 |
| 5,528,590 A | * | 6/1996 | Iidaka et al. | 370/395.65 |
| 5,602,853 A | * | 2/1997 | Ben-Michael et al. | 370/474 |
| 5,638,364 A | * | 6/1997 | Sugita | 370/397 |
| 5,815,501 A | * | 9/1998 | Gaddis et al. | 370/402 |
| 6,041,063 A | * | 3/2000 | Povlsen et al. | 370/395.53 |
| 6,175,569 B1 | * | 1/2001 | Ellington et al. | 370/401 |

FOREIGN PATENT DOCUMENTS

| | | |
|---|---|---|
| JP | 07-111507 | 4/1995 |
| JP | 11-196104 | 7/1999 |

* cited by examiner

Primary Examiner—Kenneth Vanderpuye
(74) Attorney, Agent, or Firm—Katten Muchin Zavis Rosenman

(57) ABSTRACT

The present invention provides a packet transfer system for use in an ATM network, which can realize a high-speed packet transfer by implementing a packet transfer process by hardware and also can enhance the throughput of the packet transfer process implemented by software. This packet transfer system comprises a hardware processing portion, which a memory, a packet assembling portion for causing the memory to store a packet assembled from an ATM cell received from a main circuit or an expansion circuit, a higher layer processing portion for performing higher layer processing portion according to header information sent from the packet assembling portion, and a packet determining/transmitting portion for transmitting a packet, which is determined according to a result of the higher layer processing in the higher layer processing portion as required to undergo packet processing, to an expansion circuit and for transmitting a packet, which is determined according to the result of the higher layer processing as not required to undergo packet processing, in a form of an ATM cell to a main circuit. The packet transfer system may further comprises a software processing portion, which has a second memory, a cell assembling/disassembling portion for assembling the ATM cell received from the expansion circuit into a packet, for causing the second memory to store the assembled packet, for reading the packet stored in the second memory and for transmitting the read packet in the form of an ATM cell to the expansion circuit, a packet processing portion for performing packet processing on a packet, which is received in the second memory, by software.

19 Claims, 22 Drawing Sheets

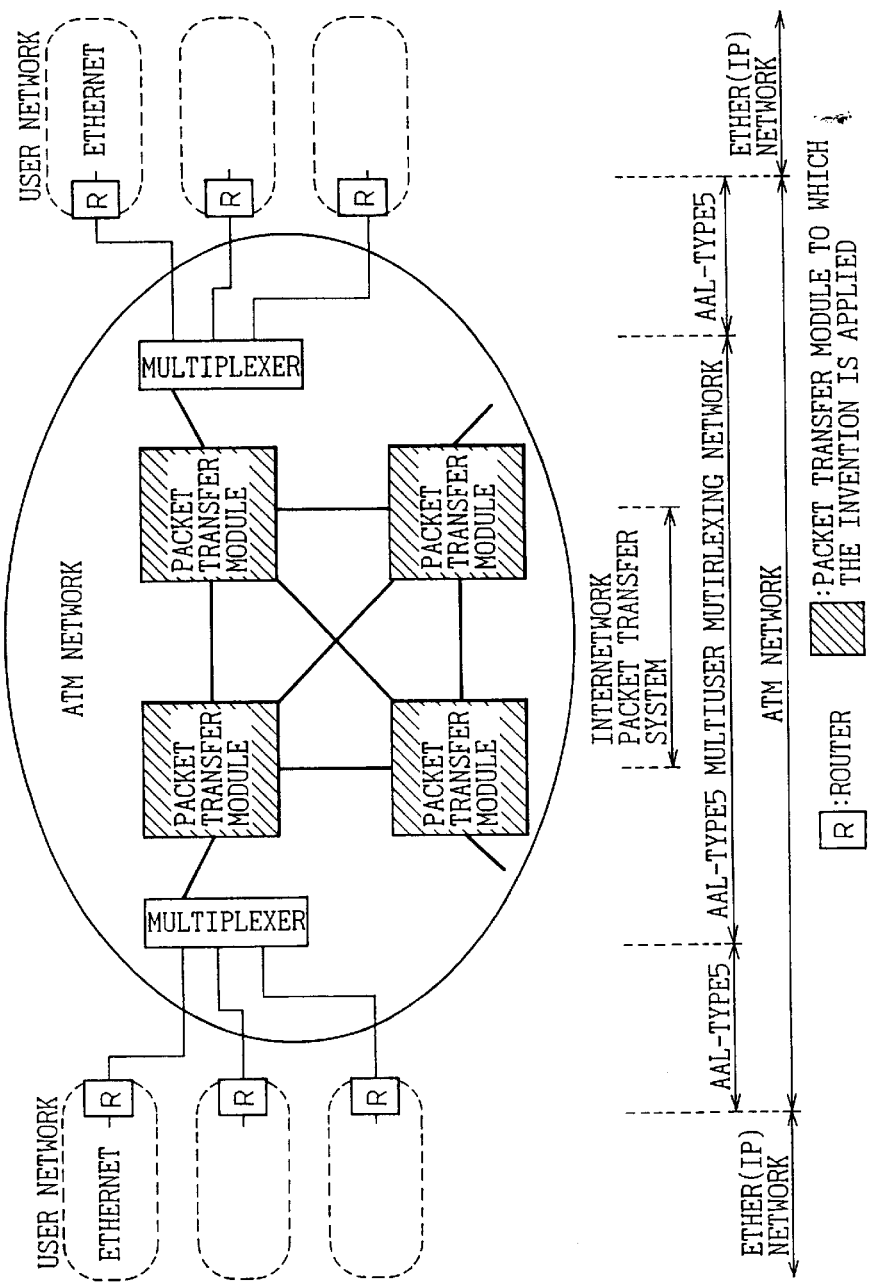

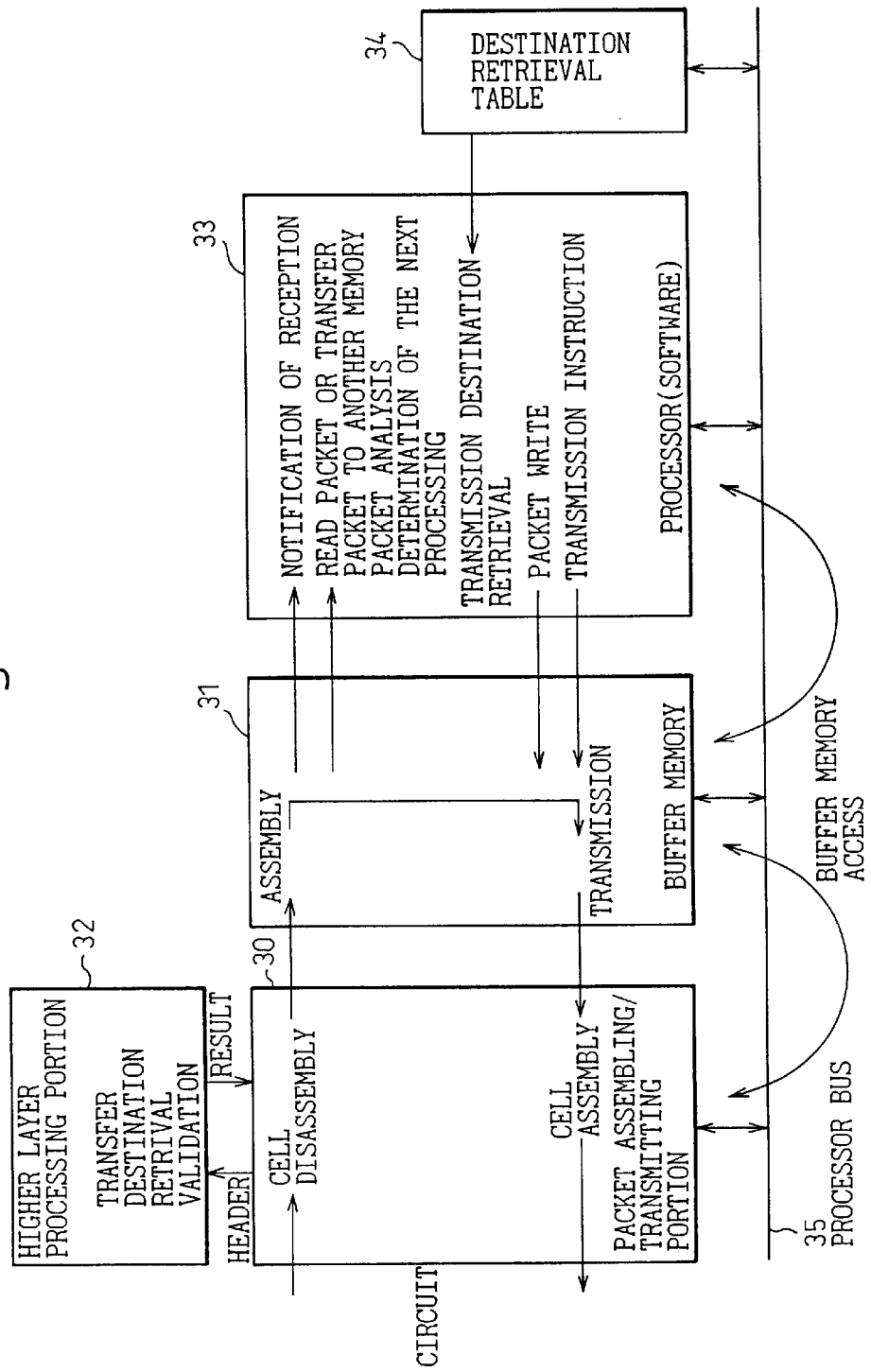

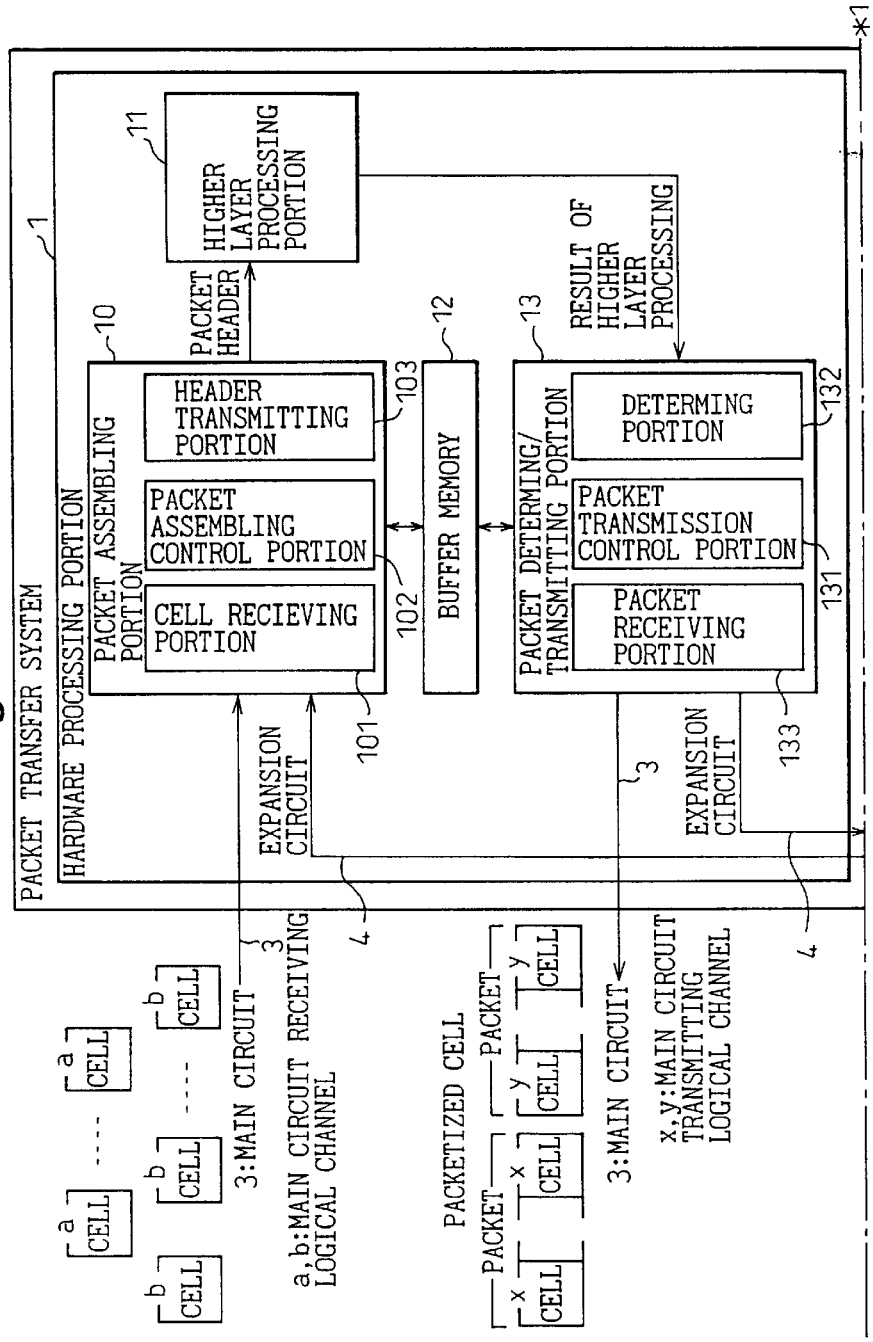

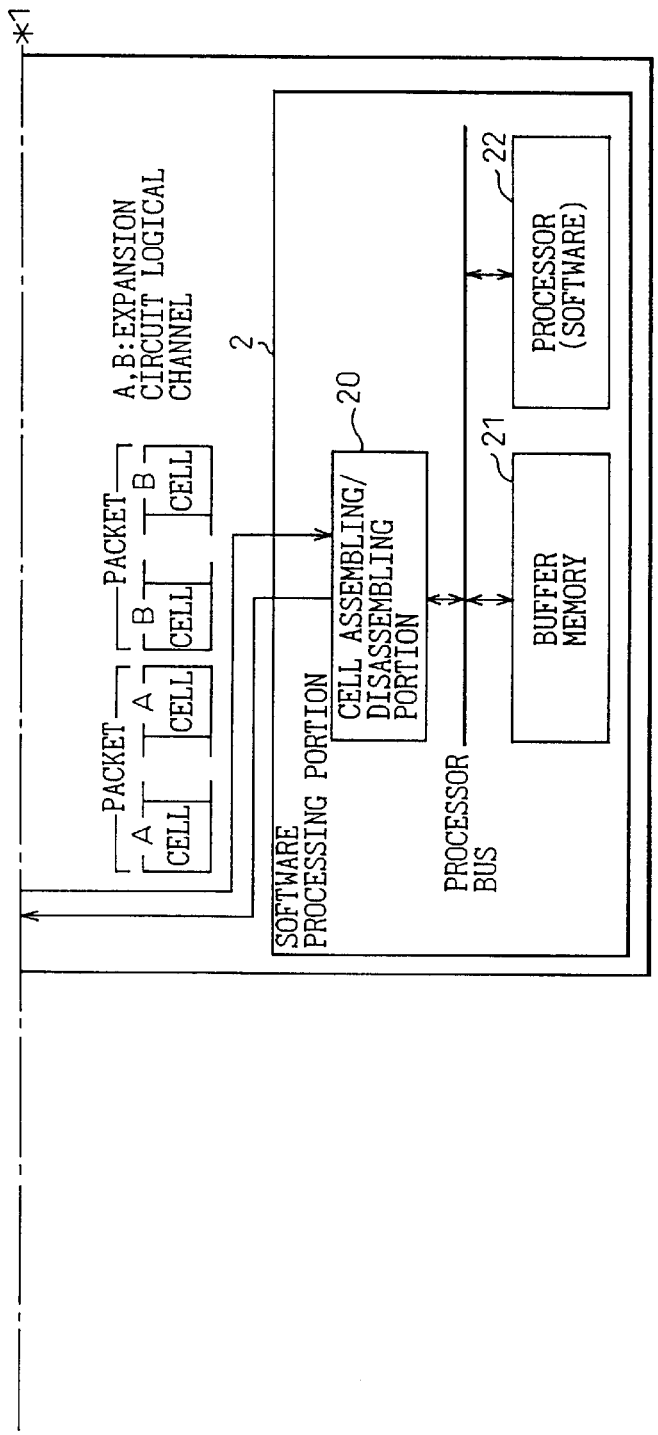

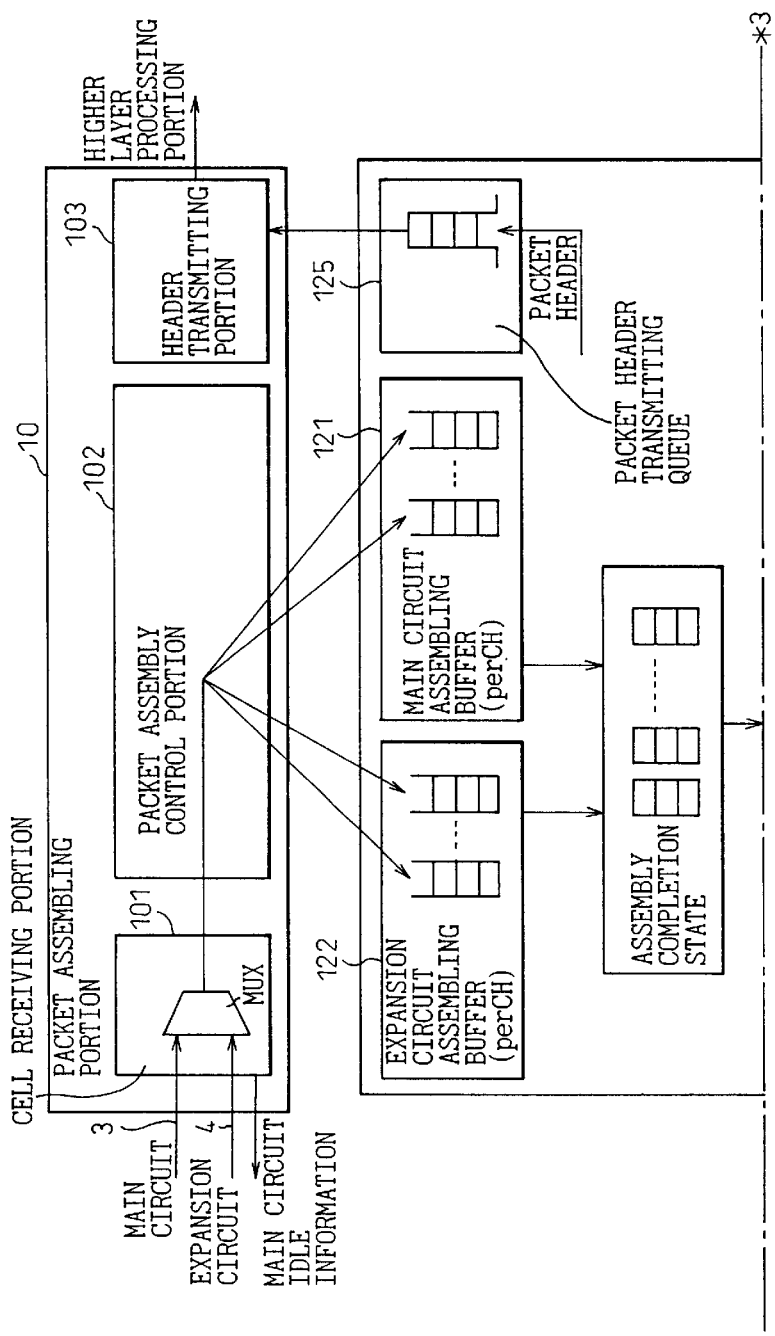

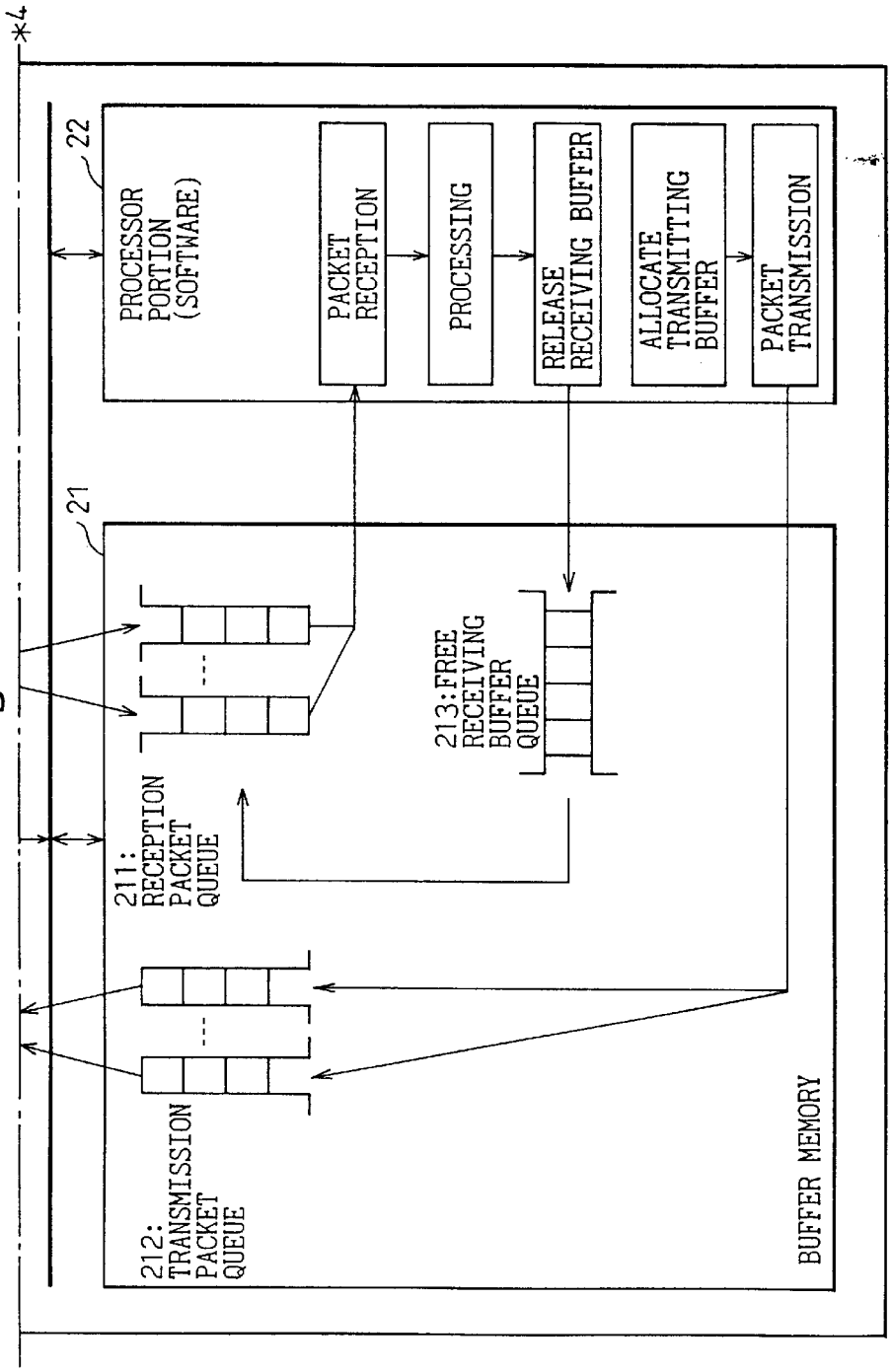

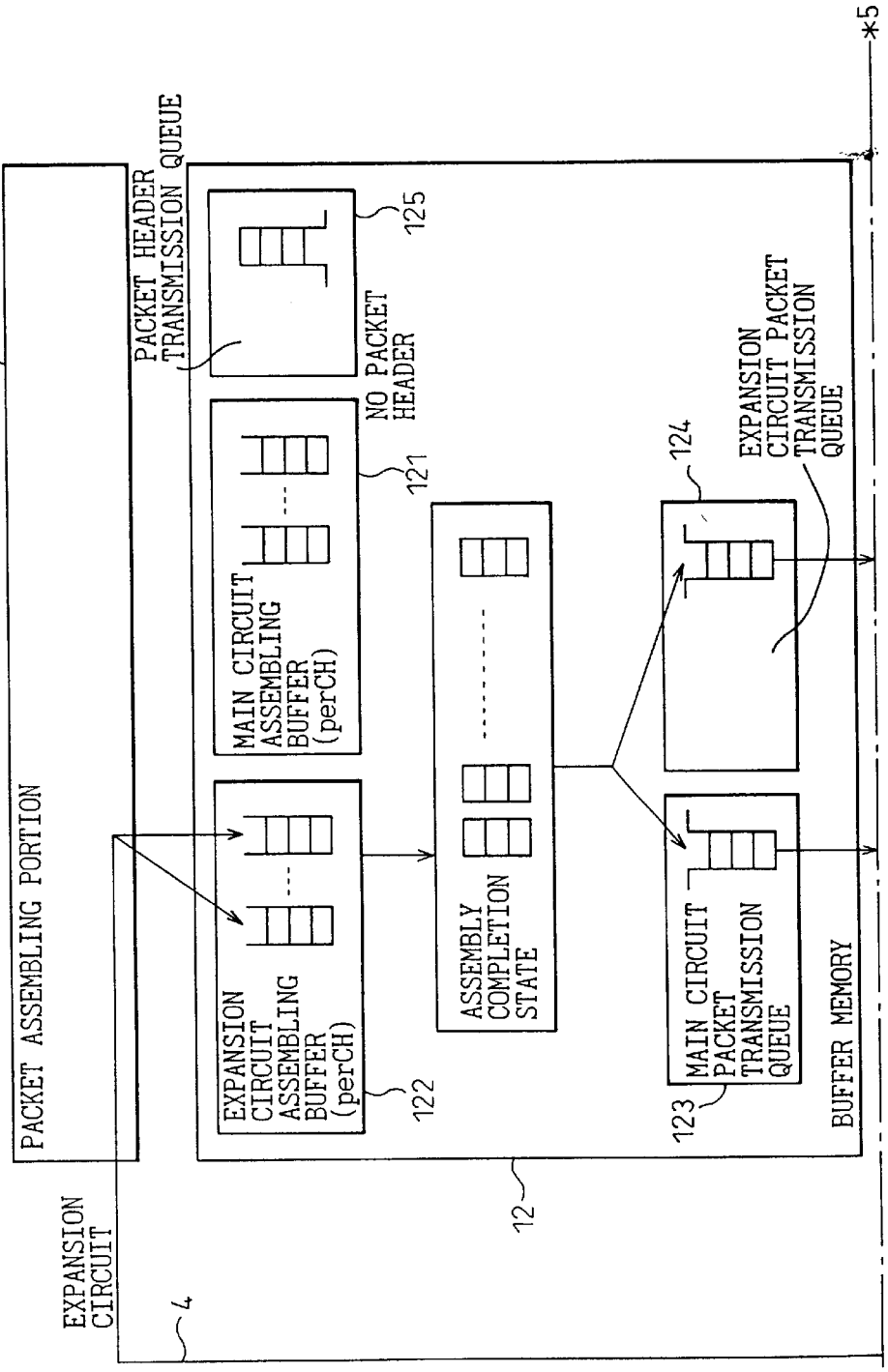

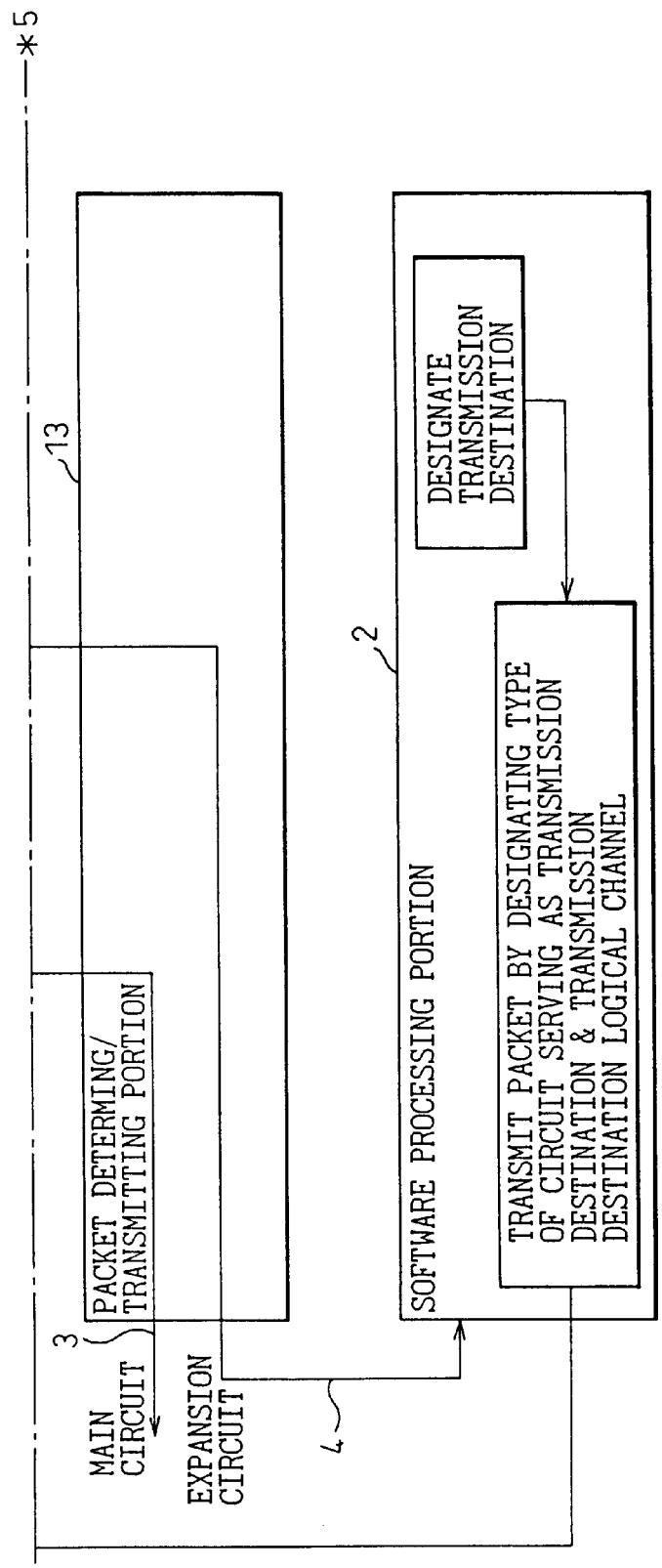

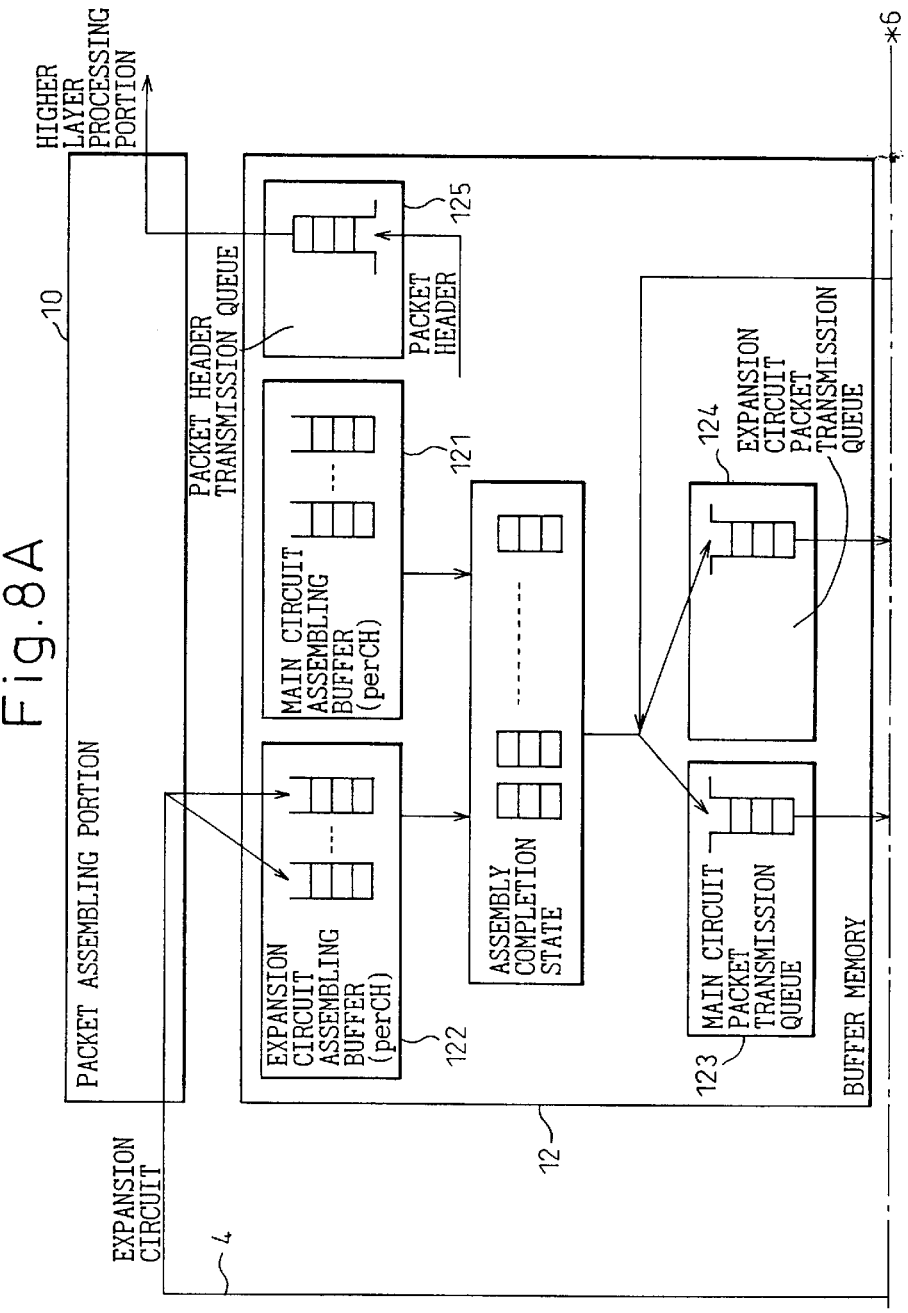

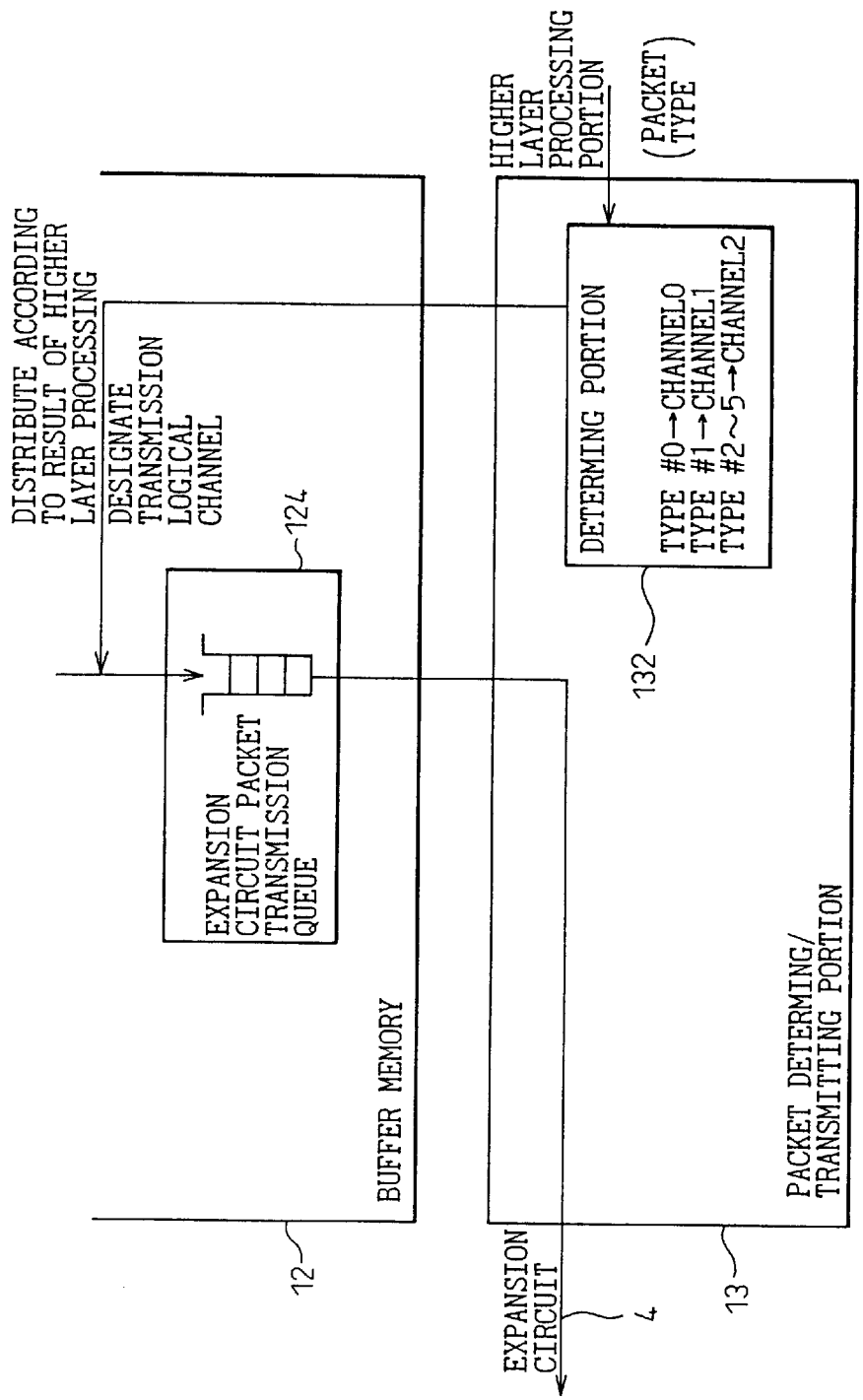

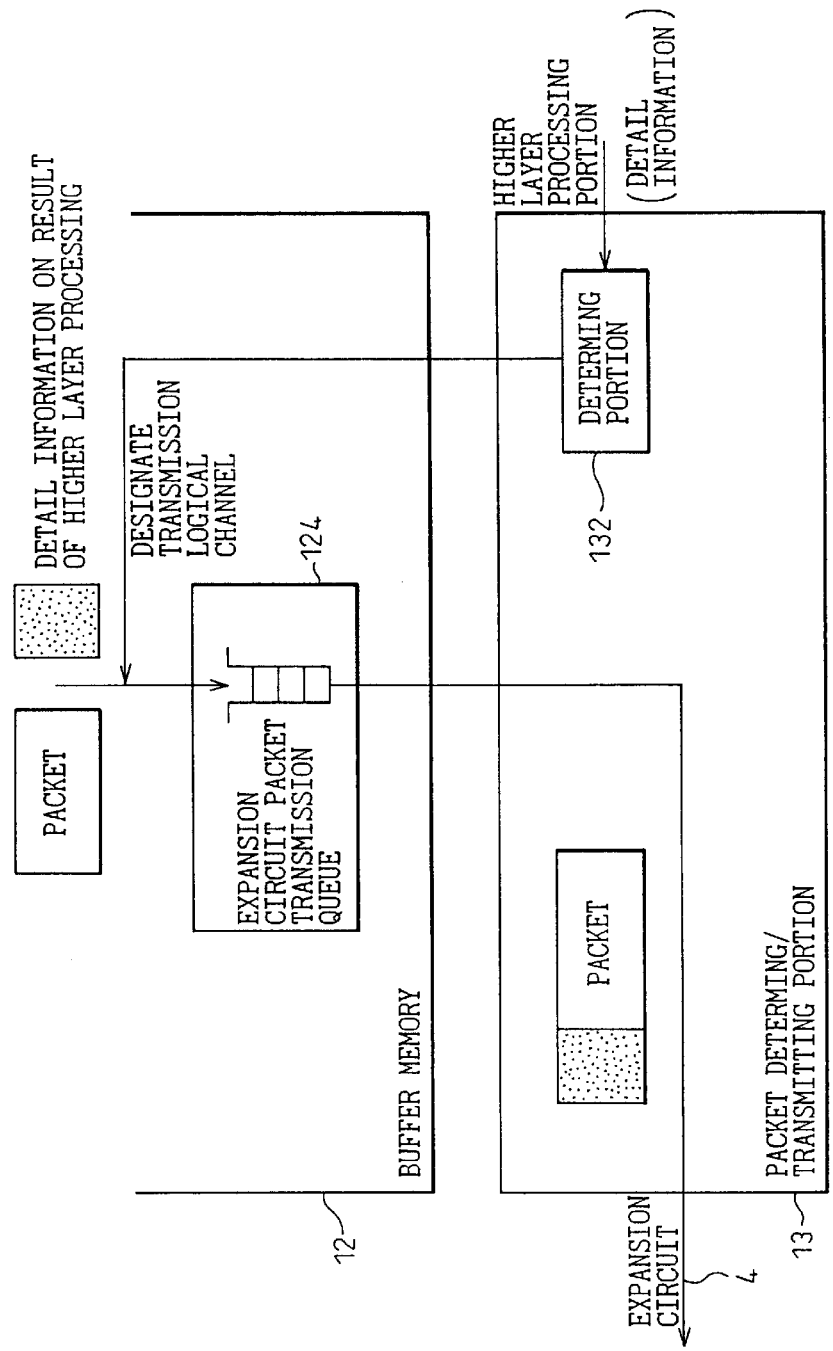

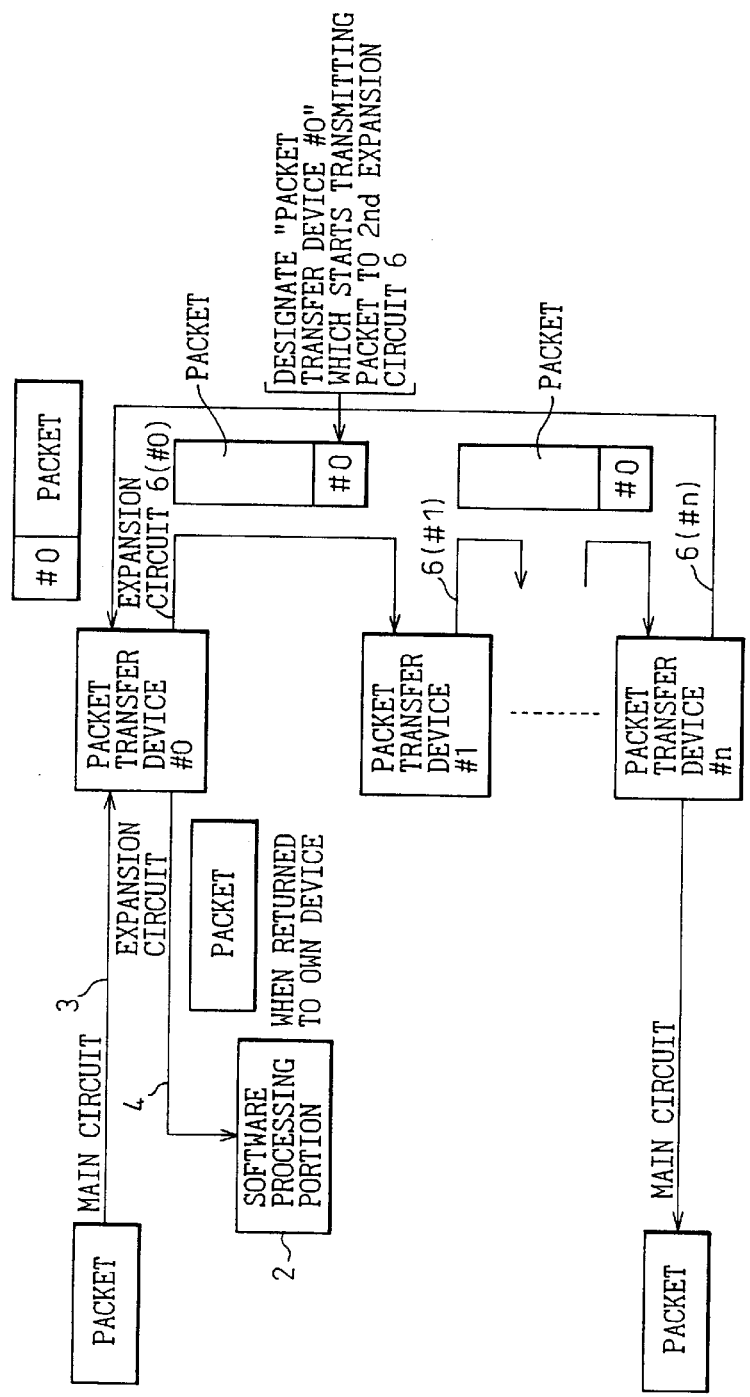

PACKET TRANSFER SYSTEM

BACKGROUND OF THE INVENTION

1. Field of the Invention

The present invention generally relates to a packet transfer system for assembling logically multiplexed ATM (Asynchronous Transfer Mode) cells into a packet and for transmitting the packet to a destination logical channel according to packet header information. More particularly, the present invention relates to a packet transfer system adapted to separate and couple a transfer performed by hardware processing and a transfer performed by software processing.

In recent years, a demand for increasing the packet transfer rate of a packet transfer system has occurred with the increase in packet traffic in an ATM network that transfers an IP (Internet Protocol) packets. Implementation of a packet transfer process consisting of a series of steps of assembling a packet, retrieving transfer destination information, and transmitting a packet by hardware has been promoted to ensure the demand. On the other hand, concurrently, there has been an increase in traffic of high-level protocol packets requiring the implementation of a packet transfer process by software. Thus, there has been a demand for enhancement of the throughput of the packet transfer process implemented by software, in addition to the demand for increasing the packet transfer rate by the implementation of the packet transfer process by hardware.

Consequently, there is a need for providing a coupling device which prevents the throughput of the packet transfer process implemented by hardware and the throughput of the packet transfer process implemented by software from affecting each other and for an auxiliary device that assists the packet receipt and transmission implemented by software.

2. Description of the Related Art

FIG. 1 illustrates the arrangement of packet transfer modules, to which the packet transfer system of the present invention is applied, in a network.

A plurality of packet transfer modules are placed in an ATM network. These packet transfer modules are connected to one another and to routers of user networks through multiplexers. The packet transfer modules, the multiplexers, and the routers are connected to one another through ATM interfaces. A packet transmitted from each of the user networks is "ATM-cellized" (in the present specification, the expression "ATM-cellized" means "assembled in a format of an ATM cell without disassembling ATM cells) by using the AAL type 5 format in the router. Then, the ATM cells transmitted from a plurality of user networks are multiplexed in the multiplexer that accommodates lines connected to a plurality of routers. Subsequently, the multiplexed ATM cells are inputted from this multiplexer to a packet transfer module.

The packet transfer module assembles the inputted ATM cells into a packet, and then retrieves a destination address from a packet header. Subsequently, the packet transfer module transmits the packet according to the destination address, which is obtained as a result of the retrieval, to a destination user network connected to a line accommodated by this transfer module itself or to another packet transfer module that accommodates a line connected to a destination user network. Meanwhile, if no destination is found as a result of the retrieval of the destination address from the packet header in the packet transfer module, this packet is terminated according to the protocol at this packet transfer module itself or, if the packet violates the protocol, the packet is not transferred but terminated at this module itself.

FIG. 2 is a diagram illustrating a principle of a conventional packet transfer system.

In this figure, reference numeral 30 designates a packet assembling/transmitting portion for receiving an ATM cell from a circuit and for transmitting an ATM cell to a circuit. Reference numeral 31 denotes a buffer memory for storing a packet to be transmitted and received. Reference numeral 32 designates a higher layer processing portion for processing header information of a packet. Reference numeral 33 denotes a processor (namely, a software processing portion) for performing software processing on a predetermined packet.

When receiving a logically multiplexed ATM cell from a circuit, the packet assembling/transmitting portion 30 disassembles the received ATM cells while the higher layer processing portion 32 retrieves a transfer destination according to a packet header and performs packet validation or verification. Then, the packet assembling/transmitting portion 30 assembles a packet and causes the buffer memory 31 to store the assembled packet. In the case that the transfer destination is determined by the higher layer processing portion 32, the packet stored in the buffer memory 31 is assembled by the packet assembling/transmitting portion 30 into a cell without software processing performed by the processor 33. Then, this cell is transmitted to the circuit.

Conversely, in the case that the implementation of the packet transfer process by hardware cannot be achieved because the transfer destination is not determined by the higher layer processing portion 32, the software processing portion 33 is notified of the packet reception. Thus, the software processing portion 33 reads this packet from the buffer memory 31 and analyzes a primary factor in transfer of the packet. Consequently, the software processing portion 33 determines the next processing to be performed.

In the case that the software processing portion 33 transmits a packet, the software processing portion 33 retrieves a destination, to which the packet is to be transferred, by using a destination retrieval table 34. Then, the software processing portion 33 writes a packet, which is to be transmitted, to the buffer memory 31 after a transfer destination is determined. Subsequently, the software processing portion 33 notifies the packet assembling/transmitting portion 30 to thereby instruct the portion 30 to transmit a packet. The packet assembling/transmitting portion 30, which is instructed to transmit the packet, assembles the packet, which is stored in the buffer memory 31, into a cell and then transmits this cell to the circuit. In this packet transfer system, accesses to the buffer memory 31 from the hardware (namely, the packet assembling/transmitting portion 30) and the software (namely, the software processing portion 33) are achieved by using the same path 35 during contention arbitration is performed.

Thus, in the case of the conventional packet transfer system, when receiving an ATM cell, a packet is assembled and stored in the buffer memory during the transfer destination retrieval and the packet validation are performed by hardware processing. In the case that the transfer destination is determined, the packet stored in the buffer memory is transmitted without software processing. Meanwhile, a packet, which needs to undergo software processing owing to the fact that the transfer destination is not determined, is received by accessing a buffer memory that is the same as the buffer memory used in the transfer implemented by hardware.

In this case, the software needs to analyze the factor that the packet is transferred, and to determine the next processing to be performed. Further, when a packet is transmitted from the software, the packet is prepared in the buffer memory and transmitted by accessing this buffer memory that is the same as a buffer memory used in the transfer implemented by the hardware. Moreover, the software needs to perform an operation of preliminarily retrieving and determining a transfer destination according to destination information of a packet.

In such a conventional packet transfer system a bus contention between an access to the buffer memory by the hardware and an access thereto by the software occurs. Thus, an increase in the number of circuits used by the software for accessing the buffer memory suppresses an access thereto by the hardware. Consequently, there has been caused a problem that the throughput of the transfer by the hardware is degraded.

Further, in the case that the priority of accesses to the buffer memory by the hardware is set in such a manner as to be higher than the priority of accesses thereto by the software, and that limitation is imposed to the circuits used by the software for accessing the buffer memory, the throughput of the transfer implemented by the software is degraded.

Moreover, the software is required to determine the kind of a protocol, according to which a packet is transferred, and to analyze a primary factor in occurrence of errors. Furthermore, in the case of the transfer of a packet, which is implemented by the software, there is the necessity for preliminarily retrieving a destination by the destination retrieval table. The processing load, in such a case, is one of factors that degrade the throughput of the software.

SUMMARY OF THE INVENTION

The present invention is accomplished in view of the aforementioned problems and the recent technology trends of the packet transfer system. Accordingly, an object of the present invention is to realize a high-speed packet transfer by implementing a packet transfer process by hardware and to enhance the throughput of the packet transfer process implemented by software.

Further, another object of the present invention is to increase the capacity of a packet transfer system by providing a device for coupling a plurality of packet transfer systems to one another.

(1) To achieve the foregoing objects, according to an aspect of the present invention, there is provided a packet transfer system that has a packet transfer device including a hardware processing portion. This device has an expansion circuit, which is connected to a software processing portion, in addition to a main circuit to be connected to an external system. A packet to be transmitted to the main circuit is read from a buffer memory and then transmitted thereto. A packet required to undergo software processing is read by the hardware processing portion itself and transmitted to the software processing portion through the expansion circuit. Further, in the buffer memory of the hardware processing portion, a packet is assembled by using an ATM cell without disassembling the ATM cell. Consequently, a buffer pointer control operation is simplified. Furthermore, an independent buffer memory for software processing is provided therein. Thus, the software processing, which is relatively slowly performed and involves frequent memory accesses for header rewriting and descriptor processing, is performed by using this buffer memory.

(2) The packet transfer system of the present invention is adapted so that the hardware processing portion writes a packet, which is received from the main circuit, to the buffer memory thereof and assembles a packet in this buffer memory, and that the software processing portion receives from the expansion circuit the packet that is transmitted to the expansion circuit by the hardware processing portion. Thus, the hardware processing portion itself writes a packet to the buffer memory and assembles a packet therein. Consequently, the hardware processing portion receives from the software processing portion, through the expansion circuit, concurrently with reception of cells from the main circuit without causing the cells to wait to be received.

(3) The hardware processing portion sends packet header information to the higher layer processing portion upon completion of assembling of a packet or a packet header portion. Then, the higher layer processing portion performs higher layer processing, such as packet validation and destination retrieval, according to packet header information, and determines the kind of the circuit and a logical channel according to a result of the higher layer processing. When a result reveals that the packet should be transmitted according to a preset protocol, the hardware processing portion transmits this packet to the software processing portion.

(4) Regarding accesses to the buffer memory of the hardware processing portion, an access thereto at reception of an ATM cell from the main circuit and an access thereto at reception of an ATM cell from the expansion circuit are performed, independently of each other, in the packet assembling portion at the cell-receiving side. Alternatively, both of such accesses to thereto are performed in common by a multiplexer. Further, the transmission of a packet to the main circuit and the transmission of a packet to the expansion circuit are performed independently of each other in the packet determining/transmitting portion at the cell-transmitting side. Alternatively, both of such transmissions are performed in common by a demultiplexer.

(5) In the case that the hardware processing portion transmits packets to the software processing portion through the expansion circuit, packet type identifiers or codes are distributed to the logical channels. Further, information on a result of the higher layer processing performed in the hardware processing portion is attached to the packet as detail information. When receiving this packet, the software processing portion determines the next processing, which is to be performed, according to the logical channel corresponding to and the detail information attached to the received packet. This eliminates the necessity for performing packet analysis processing therein, which is redundant in view of the packet analysis processing performed in the hardware processing portion.

(6) The hardware processing portion monitors the congestion state of the buffer memory in the software processing portion. When a congestion state of the common receiving buffer memory occurs, the software processing portion is controlled in such a manner as to wait for a transmission of a packet dequeued from the entire transmission queue for the expansion circuit at the side of the hardware processing portion. Conversely, when a congestion state of a receiving buffer memory corresponding to a certain logical channel at the side of the hardware processing portion is caused, the software processing portion is controlled in such a way as to wait for a transmission of a packet dequeued from all transmission queues corresponding to this logical channel at the side of the hardware processing portion. This prevents the hardware processing portion from transmitting a packet, whose priority for undergoing software processing is low, to the software processing portion. Consequently, an occurrence of buffer overflow in the software processing portion is prevented. Moreover, the need for congestion control in the software processing portion is eliminated.

(7) In the case that the software processing portion transmits a packet, whose transmission destination is not designated by software, the hardware processing portion performs transmission destination retrieval. Then, the packet is transmitted to a transmission destination obtained as a result of the retrieval. Consequently, the necessity for performing transmission destination retrieval by the software processing portion is eliminated. Thus, IP table retrieval by software becomes unnecessary.

(8) On the other hand, when it is not desired that the retrieval is performed in the hardware processing portion, a transmission destination is preliminarily retrieved by software in the software processing portion and then a packet, whose transmission destination is thus designated, is transmitted to the hardware processing portion through the expansion circuit. In this case, the packet is transmitted to the designated transmission destination without performing transmission destination retrieval in the hardware processing system. Thus, the package can be transmitted to a transmission destination, which is arbitrarily designated by the software processing portion, by the hardware processing portion.

(9) The software processing portion divides the transmission queue for the main circuit into a plurality of parts respectively corresponding to packet types. Moreover, the software processing portion divides the transmission queue for the expansion circuit into a plurality of parts respectively corresponding to packet types. Furthermore, transmission scheduling is performed among packets contained the transmission queues corresponding to the main circuit or the transmission queues corresponding to the expansion circuit or all of these transmission queues. Additionally, packets are transmitted by enabling the setting of a priority corresponding to each of packet types. Consequently, the software processing portion can preferentially receive a packet of a high priority.

(10) Further, the packet transfer system of the present invention has a plurality of packet transfer devices each constituted by a hardware processing portion, which are connected to a single software processing portion. Thus, the system is adapted so that the plurality of hardware processing portions, that is, packet transfer devices, which are appropriate to the throughput of the software processing portion, can be connected to the software processing portion.

(11) Furthermore, this packet transfer system is adapted so that a packet, whose transmission destination is not obtained by performing higher layer processing in a hardware processing portion, can be transmitted to another hardware processing portion through a second expansion circuit, and that each of hardware processing portions can receive a packet from the second expansion circuit. Thus, in the case that each hardware processing portion cannot obtain a transmission destination of a packet in an own higher layer processing portion, the transmission destination is retrieved by another higher layer processing portion. Consequently, a packet received by one of the packet transfer devices can be transmitted from another of the packet transfer devices.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 1 is a diagram illustrating the arrangement of packet transfer modules, to which the packet transfer system of the present invention is applied, in a network;

FIG. 2 is a diagram illustrating the constitution of a conventional packet transfer system;

FIGS. 3A and 3B are diagrams illustrating the constitution of a packet transfer system that is an embodiment of the present invention;

FIGS. 5A and 5B are diagrams illustrating an embodiment of a hardware processing portion having a device for multiplexing and demultiplexing a main circuit and an expansion circuit;

FIGS. 6A and 6B are diagrams illustrating packet processing performed in the software processing portion;

FIGS. 7A and 7B are diagrams illustrating an operation of the hardware processing portion in the case that the software processing portion designates a transmission destination;

FIGS. 8A and 8B are diagrams illustrating an operation of the hardware processing portion in the case that the software processing portion does not designate a transmission destination;

FIG. 9 is a diagram illustrating the case of distributing transmitting logical channels packets in the hardware processing portion according to types thereof;

FIG. 10 is a diagram illustrating an operation of adding detail information concerning a result of higher layer processing to a packet in the hardware processing portion;

FIG. 15 is a diagram illustrating an operation of the embodiment shown in FIGS. 14A and 14B.

DETAILED DESCRIPTION OF THE PREFERRED EMBODIMENTS

Figure 4A:
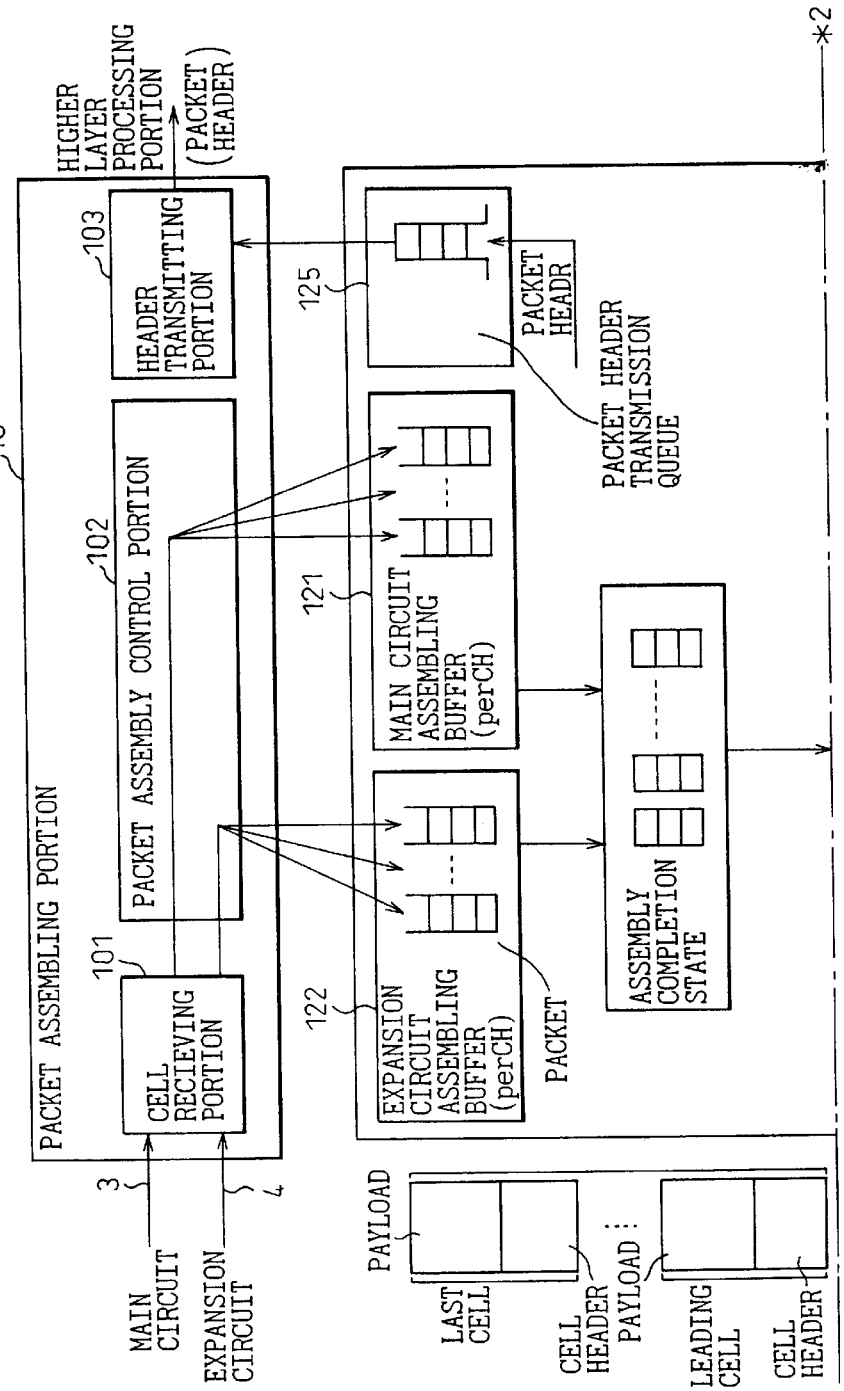
FIGS. 4A and 4B are diagrams illustrating operations of assembling and transmitting a packet in a hardware processing portion.

Hereinafter, the preferred embodiments of the present invention will be described in detail by referring to the accompanying drawings.

FIGS. 3A and 3B are diagrams illustrating the configuration of a packet transfer system, which is an embodiment of the present invention. As shown in this figure, the packet transfer system according to this embodiment comprises a hardware processing portion 1 and a software processing portion 2. In this embodiment, a programmable large-scale integrated (LSI) circuit, such as FPGA (Field Programmable Gate Array), is used as the hardware processing portion 1. Further, an ordinary microprocessor circuit is used as the software processing portion 2. The hardware processing portion 1 is connected to a main circuit 3, and transmits ATM cells thereto, and receives ATM cells therefrom. An expansion circuit 4 connects the hardware processing portion 1 to the software processing portion 2. ATM cells are transmitted and received through this expansion circuit 4.

The hardware processing portion 1 includes a packet assembling portion 10, a higher layer processing portion 11, a buffer memory 12, and a packet determining/transmitting portion 13. When the packet assembling portion 10 receives logically multiplexed ATM cells (namely, a cell a, a cell b, a cell a, a cell b, . . . ), this portion 10 assembles the ATM cells into an "ATM-cellized" packet correspondingly to each logical channel (a cell a, a cell a, . . . ; a cell b, a cell b, . . . ). Incidentally, the expression "an ATM-cellized packet" means "a packet assembled in a format of an ATM cell without disassembling an ATM (that is, a stream of ATM cells in packets). Further, a packet assembled in the case of employing AAL type 5 as the protocol used on the ATM network is referred to as an "ATM-cellized AAL5 packet". Upon completion of assembling the packet or a packet header, the packet assembling portion 10 transmits the packet header to the higher layer processing portion 11.

The higher layer processing portion 11 receives the packet header of the ATM-cellized packet, which is received by the packet assembling portion 10, and then performs high layer processing, such as packet validation, protocol determination (OSPF (Open Shortest Path First) protocol, IGMP (Internet Group Management Protocol), ICMP (Internet Control Message Protocol), RSVP (Internet Reservation Protocol), and destination retrieval according to the packet header. Moreover, the portion 11 determines the types of a circuit and a logical channel, which are used for transmitting a packet. Then, a signal representing a result of such processing is transmitted therefrom to the packet determining/transmitting portion 13.

The buffer memory 12 is operative to assemble the received ATM-cellized AAL 5 packet into a packet by maintaining the format of an ATM cell, and to store the assembled packet. Consequently, a buffer pointer control operation can be simplified.

When receiving a result of the processing from the higher layer processing portion 11, the packet determining/transmitting portion 13 reads a packet, which corresponds to the result of the processing, from the buffer memory 12 and then transmits the read packet to the main circuit 3 or to the expansion circuit 4. At that time, according to the result of the processing performed in the higher layer processing portion 11, ordinary packets (a cell x, a cell x, . . . ; a cell y, a cell y, . . . ) are transmitted to the main circuit 3 without change. However, a packet required to undergo software processing (a cell A, a cell A, . . . ; a cell B, a cell B, . . . ) is transmitted to the expansion circuit 4 on a logical channel. This is an ATM-cellized AAL 5 packet.

The software processing portion 2 includes a cell assembling/disassembling portion 20, a buffer memory 21, and a processor 22. When receiving ATM cells, the cell assembling/disassembling portion 20 disassembles ATM cells received from the expansion 4. Thus, resultant data is assembled as packet data, and stored in the buffer memory 21. On the other hand, when transmitting ATM cells, the ATM cells are transmitted to the expansion circuit 4 after the packet stored in the buffer memory 21 is assembled into ATM cells. The processor 22 is a portion for performing software processing, and thus performs packet processing on the received packet by software processing.

Hereinafter, an outline of an operation of this packet transfer system is described.

When the cell receiving portion 101 of the hardware processing portion 1 receives an AAL 5 packet, which is logically multiplexed and ATM-cellized, from the main circuit 3, the packet assembly control portion 102 assembles a packet (namely, the ATM-cellized AAL 5 packet) in the buffer memory 12 correspondingly to each logical channel. Upon completion of assembling the packet or a packet header thereof, the header transmitting portion 103 transmits the packet header of the received packet to the higher layer processing portion 11. Then, the higher layer processing portion 11 performs the validation of the packet, the protocol determination, and the destination retrieval according to the received packet header. Subsequently, a result of such processing is transmitted to the packet determining/transmitting portion 13.

When receiving the result of the processing performed by the higher layer processing portion 11, the packet determining/transmitting portion 13 reads a packet (namely, an ATM-cellized AAZL 5 packet), which corresponds to the result of the processing, from the buffer memory 12, and then transmits the read packet to the main circuit 3 or to the expansion circuit 4 according to the result of the higher layer processing on a designated logical channel. At that time, a packet, whose transmission destination is obtained by the higher layer processing portion 11, is transmitted to the main circuit 3. Conversely, a packet, the transfer of which cannot be performed by hardware owing to the fact that the transmission destination does not obtained, is required to undergo the packet processing by software. Thus, such a packet is transmitted to the software processing portion 2 through the expansion circuit 4.

Thus, this hardware processing portion 1 serving as a packet transfer means implemented by hardware is provided with the expansion circuit 4 connected to the software processing portion 2, in addition to the main circuit 3 connected to an external device. A packet transmitted to the main circuit 3 is read from the buffer memory 12 and then transmitted thereto. Moreover, a packet that needs to undergo software processing is read by the hardware itself from the buffer memory 12 and then transmitted to the expansion circuit 4.

When receiving the ATM-cellized AAL 5 packet, whose transmission destination is not determined, from the expansion circuit 4, the software processing portion 2 causes the cell assembling/disassembling portion 20 to disassemble the ATM cell and then transmit the resultant data to the buffer memory 21, in which the packet data is assembled. Moreover, the cell assembling/disassembling portion 20 informs the processor 22 (or software) of the reception of the packet. When informed of the packet reception, the processor 22 makes judgement on the received packet data and performs a packet receiving operation, such as the determination of the protocol type of the transferred packet, and the analysis of factors of an error. When necessary, the processor 22 retrieves the destination of the packet and terminates a packet whose transmission destination is not obtained.

In the case that the processor (or software) 22 transmits a packet as a result of, for example, the fact that the destination is obtained, the processor 22 prepares the packet, which is to be transmitted, in the buffer memory 21. Then, the processor 22 instructs the cell assembling/disassembling portion 20 to transmit the packet. The cell assembling/disassembling portion 20 reads the packet, the transmission of which is instructed, from the buffer memory 21. Then, the packet is ATM-cellized. Subsequently, the ATM-cellized packet is transmitted to the hardware processing portion 1 through the expansion circuit 4. Thus, the packet reception and the packet transmission in the software processing portion 2 are performed concurrently with and independently of the packet transfer by the hardware processing portion 1.

When receiving the ATM-cellized packet from the expansion 4, the packet assembling/disassembling portion 10 assembles an ATM-cellized packet and then transmits the packet to a logical channel designated according to an instruction issued from the software processing portion 2 or to the result of the processing in the higher layer processing portion 11, as in the case of receiving the packet from the main circuit 3.

Thus, the hardware processing portion 1 writes the packet, which is received from the main circuit 3, to the buffer memory 12 and assembles a packet. In addition, the hardware processing portion 1 receives the packet transmitted by the software processing portion 2 and then writes the packet to the buffer memory 12 and assembles a packet therein by hardware itself.

Hereinafter, each of embodiments of the present invention, the detail constitution of the packet assembling portion 10, the higher layer processing portion 11, the buffer memory 12, and the packet determining/transmitting portion 13 of the hardware processing portion 1, and the detail constitution of the cell assembling/disassembling portion 20, the buffer memory 21, and the processor (or software) 22 of the software processing portion 2 will be described.

Figure 4B:
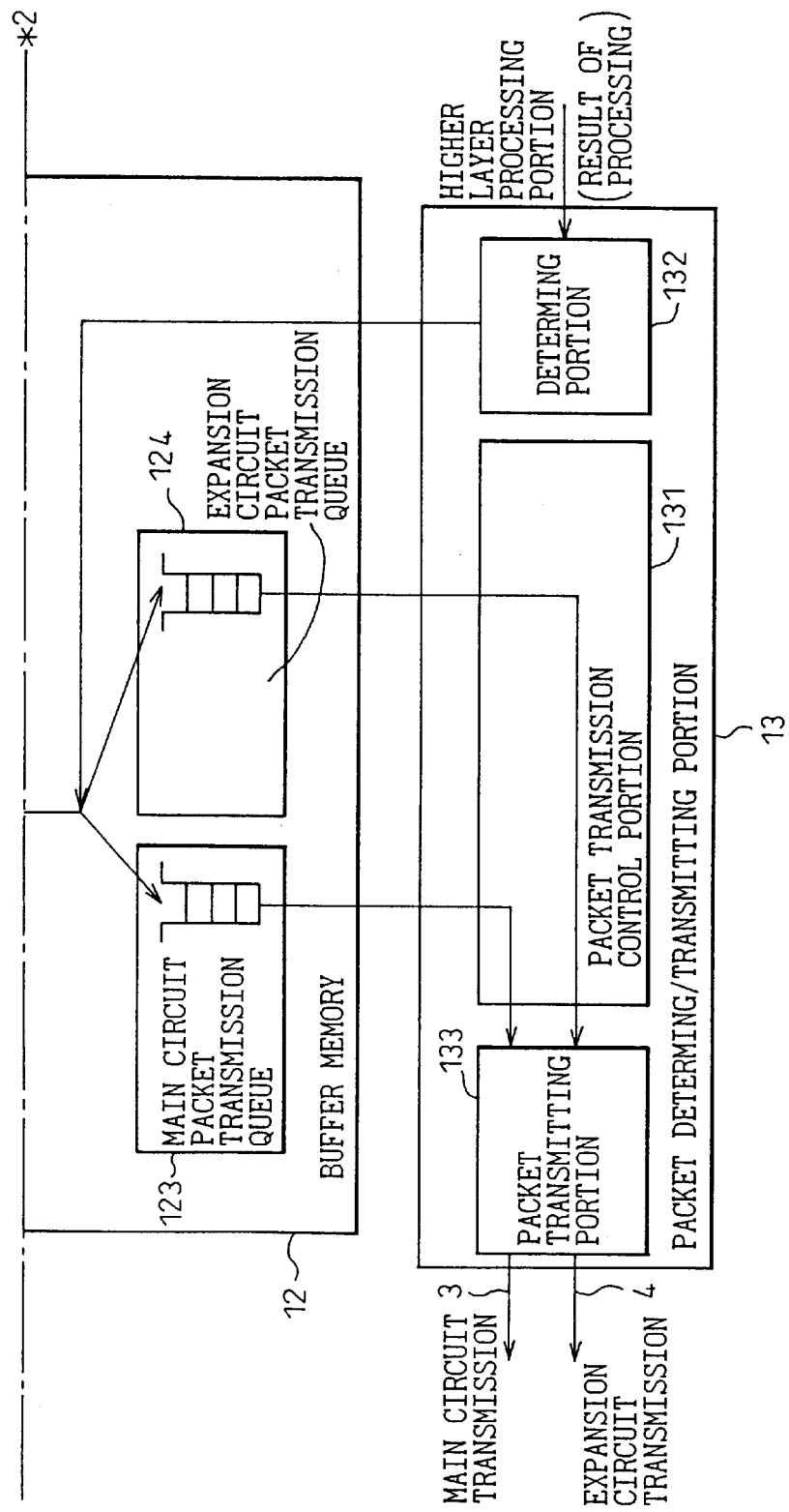

FIGS. 4A and 4B illustrate an operation from the assembly of a packet to the transmission thereof according to the present invention.

As illustrated in FIGS. 4A and 4B, the packet assembling portion 10 includes the cell receiving portion 101, the packet assembly control portion 102, the header transmitting portion 103. In the hardware processing portion 1 of this embodiment, the access speed (X), at which the buffer memory 2 is accessed, is set in such a manner as to be sufficient for simultaneously transmitting a packet to and receiving a packet from the main circuit 3 (whose circuit or line speed is X1) and the expansion circuit 4 (whose circuit speed is X2), that is, $X \geq X1+X2$. Namely, the packet assembling portion 10 can simultaneously receive packets from the main circuit 3 and the expansion circuit 4 without cell loss. The access speed, at which the buffer memory is accessed, is set so that the packet determining/transmitting portion 13 can simultaneously transmit packets to the main circuit 3 and the expansion circuit 4. Incidentally, the cell receiving portion 101 receives ATM cells from the main circuit 3 or the expansion circuit 4. The packet assembly control portion 102 performs a control operation according to the received ATM cell so that a packet is assembled in the buffer memory 12. The header transmitting portion 103 transmits the packet header, which is obtained from the ATM-cellized packet, to the higher layer processing portion 11.

As illustrated in FIGS. 4A and 4B, the buffer memory 12 includes buffers, such as a main circuit assembling buffer 121, an expansion circuit assembling buffer 122, a main circuit packet transmission queue 123, an expansion circuit packet transmission queue 124, and a packet header transmission queue 125. Incidentally, the main circuit assembling buffer 121 is used for assembling and storing a ATM-cellized packet, which is received from the main circuit 3, correspondingly to each logical channel. The expansion circuit assembling buffer 122 is used for assembling and storing a ATM-cellized packet, which is received from the expansion circuit 4, corresponding to each logical channel. The main circuit packet transmission queue 123 is used for causing the ATM-cellized packet, which is completely assembled and received from the main circuit 3, to wait to be transmitted. The expansion circuit packet transmission queue 124 is used for causing the ATM-cellized packet, which is completely assembled and received from the expansion circuit 4, to wait to be transmitted. The packet header transmission queue 125 is used for causing the packet header of the received ATM-cellized packet, which is received in the assembling buffer 121 or 122, to wait to be transmitted to the header transmitting portion 103.

Further, the packet determining/transmitting portion 13 includes a packet transmission control portion 131, a determining portion 132, and a packet transmitting portion 133. Incidentally, the determining portion 132 is operative to instruct according to a result of the processing performed in the higher layer processing portion 11 to distribute the ATM-cellized packets, the assembly of which is completed, to the main circuit packet transmission queue 123 or the expansion circuit packet transmission queue 124. The packet transmission control portion 131 performs a control operation in such a manner as to transmit the packets enqueued to the packet transmission queue 123 or 124. The packet transmitting portion 133 is operative to transmit the ATM-cellized packets, which are received from the packet transmission control portion 131, to the main circuit 3 or to the expansion circuit 4.

Figure 5B:
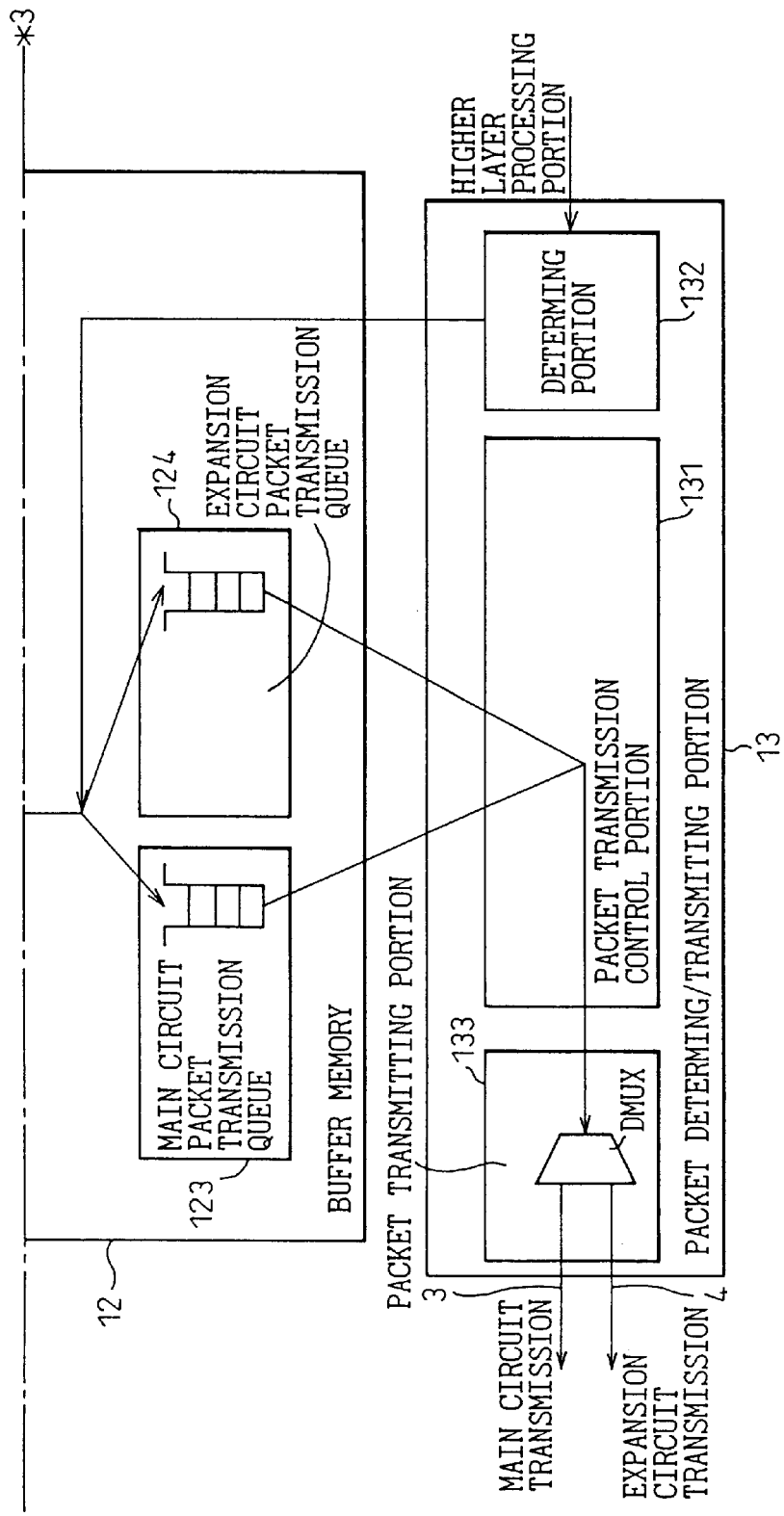

FIGS. 5A and 5B illustrate a modification of the embodiment shown in FIGS. 4A and 4B.

This embodiment is a modification of the embodiment of FIGS. 4A and 4B in the case where the access speed (X), at which the buffer memory 12 is accessed, is insufficient to allow both the main circuit 3 (whose circuit speed is X1) and the expansion circuit 4 (whose circuit speed is X2) to receive or transmit packets (that is, X<X1+X2). For example, the circuit speeds of the main circuit 3 and the expansion circuit 4 are 600 MHz (X1=X2=600 MHz), and the access speed (X) of the buffer memory 12 is less than 1.2 GHz (X<1.2 GHz). In this case, when a packet is assembled and transmitted, it is necessary to multiplex and demultiplex the cells received from the main circuit 3 and the expansion circuit 4 (refer to 101 and 133). An example of the hardware processing portion 1 illustrated in FIGS. 5A and 5B implements such packet assembly and packet transmission.

As shown in FIGS. 5A and 5B, a multiplexing portion enabled to selectively switch input packets, namely, to select only one of the main circuit 3 and the expansion circuit 4 and to receive packets from the selected circuit is provided in the cell receiving portion 101 of the packet assembling portion 10. Moreover, when no packets are received from the main circuit 3, this portion has a function of notifying the software processing portion 2 of main circuit idle information. On the other hand, a demultiplexing portion enabled to select and switch the circuit, to which the received ATM-cellized AAL 5 packet is transmitted, from the main circuit 3 and the expansion circuit 4 is provided in the packet transmitting portion 133 of the packet determining/transmitting portion 13.

Figure 6A:
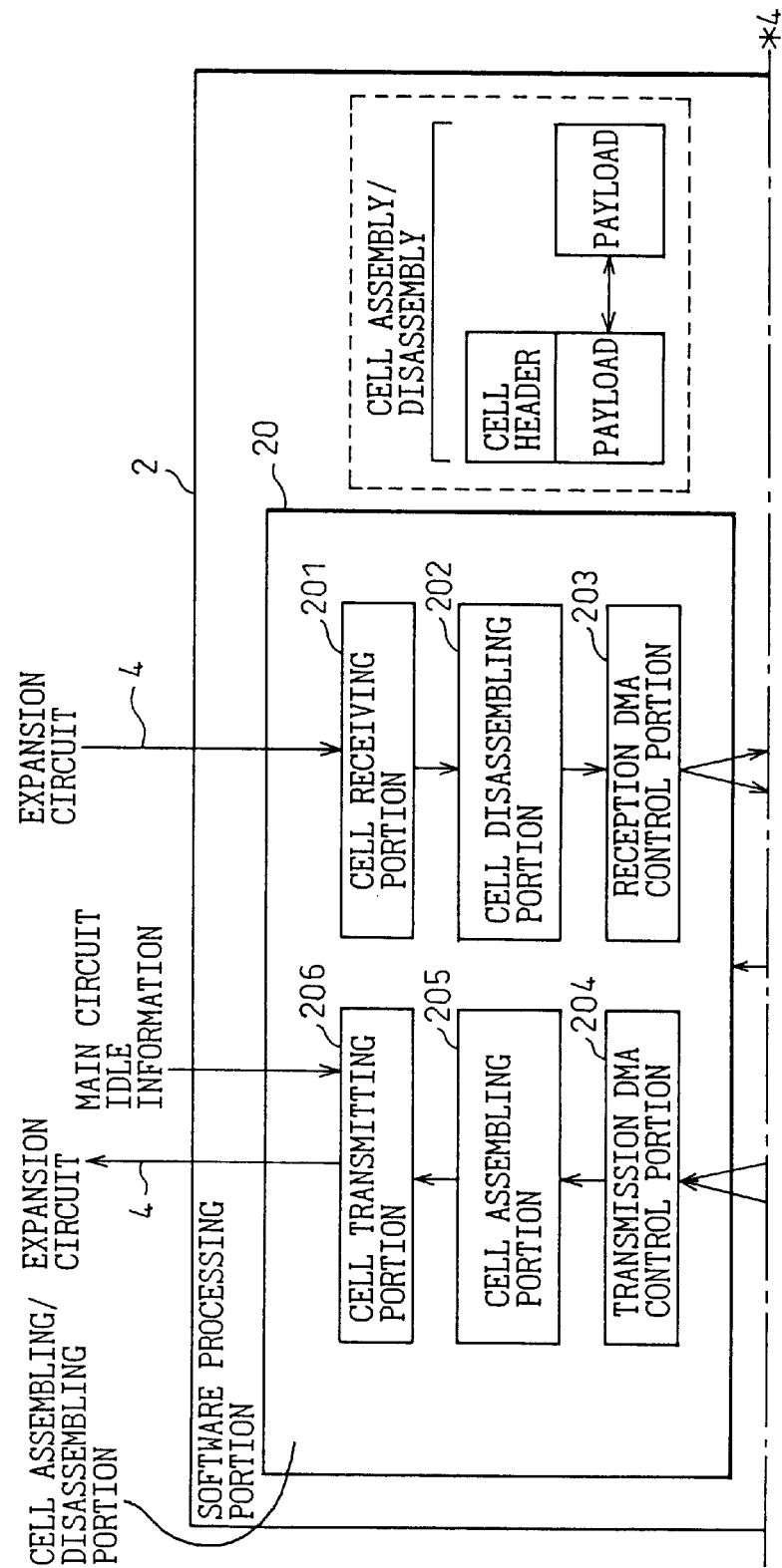

FIGS. 6A and 6B illustrate the detail constitution of the software processing portion 2 corresponding to FIGS. 5A and 5B. The software processing portion 2 of this example is used by being combined with main circuit idle information from the hardware processing portion 1 illustrated in FIGS. 5A and 5B.

As shown in FIGS. 6A and 6B, the cell assembling/disassembling portion 20 comprises a cell receiving portion 201, a cell disassembling portion 202, a reception DMA control portion 203, a transmission DMA control portion 204, a cell assembling portion 205, and a cell transmitting portion 206. Incidentally, the cell receiving portion 201 receives ATM cells from the expansion circuit 4. The cell disassembling portion 202 disassembles the received ATM cells and separates a payload portion (refer to a rightwardly upwardly illustrated frame "CELL DISASSEMBLY (PAYLOAD)", which is indicated by dashed lines, in this figure). The reception DMA control portion 203 performs a control operation in such a way as to write a packet, into which the received payload portion is assembled, to the buffer memory 21 by using a DMA (Direct Memory Access) method. The transmission DMA control portion 204 performs a control operation in such a way as to read a packet stored in the buffer memory 21 by using the DMA method, and to send the packet to the cell assembling portion 205. The cell assembling portion 205 assembles the received packet into an ATM cell (refer to a rightwardly upwardly illustrated frame "CELL ASSEMBLY (CELL HEADER+ PAYLOAD)", which is indicated by dashed lines, in this figure).

The cell transmitting portion 206 transmits the received ATM cell to the expansion circuit 4 when this portion is notified according to the main circuit idle information provided by the hardware processing portion 1 of FIGS. 5A and 5B of the fact that the main circuit 3 is idle. Incidentally, the buffer memory 21 comprises a reception packet queue 211, a transmission packet queue 212, and a free receiving buffer queue 213. Incidentally, the reception packet queue 211 is operative to cause the received packet to wait. The free receiving buffer queue 213 is operative to cause the free receiving buffer to wait.

Hereinafter, the entire operation of each of the embodiments illustrated in FIGS. 4A, 4B, 5A, and 5B is described in detail based on the foregoing description.

First, in the case of the embodiment of FIGS. 4A and 4B, the cell receiving portion 101 of the packet assembling portion 10 receives ATM cells from the main circuit 3 or the expansion circuit 4 and then sends the ATM cells to the packet assembly control portion 102. Then, the packet assembly control portion 102 assembles and stores ATM-cellized packets in the assembling buffers 121 and 122 of the buffer memory 12, which respectively correspond to the circuits and the logical channels, of the buffer memory 12. The storage of the packets in this buffer memory 12 simplifies buffer management by maintaining the format of the ATM cell without disassembling the ATM cell. The access speed, at which the buffer memory 12 is accessed, is sufficient to the extent that no cell loss occurs even in the case when the main circuit 3 and the expansion circuit 4 simultaneously receive the cells.

Upon completion of assembling a packet, or upon completion of assembling only a packet header, the header transmitting portion 103 of the packet assembling portion 10 first transmits the packet header to the higher layer processing portion 11 through the packet header transmission queue 125. Further, upon completion of assembling a packet in the main circuit assembling buffer 121 or in the expansion circuit assembling buffer 122, the packet is put into a assembly completion state. Then, the portion 13 waits for a result of the processing sent from the higher layer processing portion 11.

The higher layer processing portion 11 performs the packet validation, the protocol determination, and the destination retrieval according to the received packet header, and transmits the result of the processing to the determining portion 132 of the packet determining/transmitting portion 13.

When receiving the result of the processing from the higher layer processing portion 11, the determining portion 132 judges the result of the processing. Then, the determining portion 132 distributes packets corresponding to the result of the processing to the main circuit packet transmission queue 123 when the transfer destination is obtained according to the result of the processing, alternatively, to the expansion circuit transmission queue 124 when the transfer destination is not obtained. Incidentally, at that time, when the packet is being assembled, the portion 132 distributes the packet to the transmission queue 123 or 124 upon completion of assembling the packet.

The packet transmission control portion 131 monitors the states of the transmission queues 123 and 124. In the case that a packet is enqueued in the main circuit packet transmission queue 123, the packet is transmitted to the main circuit 3. Alternatively, when a packet is enqueued in the expansion circuit packet transmission queue 124, the packet is transmitted to the expansion circuit 4. At that time, the packetized ATM cell, the logical channel corresponding to which is converted into another logical channel designated through the determining portion 132 from the higher layer processing portion 11, is transmitted through the packet transmitting portion 133.

At that time, the access speed, at which the buffer memory 12 is accessed, is sufficient to the extent that the packets are simultaneously transmitted from both the main circuit 3 and the expansion circuit 4.

Next, regarding the embodiment of FIGS. 5A and 5B, the multiplexer portion of the cell receiving portion 101 multiplexes the ATM cell received from the main circuit 3 and the ATM cell received from the expansion circuit 4. Further, the multiplexer portion is changed so that the portion 101 can receive a packet only from one of the circuits. The packet assembly control portion 102 discriminates the ATM cell, which is received from the main circuit 3, and the ATM cell, which is received from the expansion circuit 4, from each other and stores these ATM cells in the assembling buffers respectively corresponding to the circuits and the logical channels, which correspond to the buffer memory 12.

The packet transmission control portion 131 reads a packet, which is enqueued in one of the main circuit packet transmission queue 123 and the expansion circuit packet transmission queue 124, from the buffer memory 12. The packets read from this buffer memory 12 are demultiplexed by the demultiplexer portion of the packet transmitting portion 133 into packets respectively transmitted from the main circuit 3 and the expansion circuit 4.

According to the multiplexing method employed in the cell receiving portion 101, usually, the priority of the cell received from the main circuit 3 is set at a high level, while the priority of the cell received from the expansion circuit 4, which can be made to wait by using the buffer memory 21 of the software processing portion 2, is set at a low level. Further, the system is adapted so that the cell is received from the expansion circuit 4 according to the priorities only when the main circuit 3 is idle and the reception of the cell from the main circuit 3 is not performed. Thus, the software processing portion 2 is always informed of free circuit information on the main circuit 3 so as to restrain the software processing portion 2 from transmitting cells.

As illustrated in FIGS. 6A and 6B, the software processing portion 2 receives the ATM-cellized AAL 5 packet from the expansion circuit 4 at the cell receiving portion 201 of the cell assembling/disassembling portion 20, and then sends the packet to the cell disassembling portion 202. Subsequently, the cell disassembling portion 202 disassembles the received ATM cell only into the payload portion of the ATM cell. Then, the payload portion is transferred to an idle receiving buffer (not shown) of the buffer memory 21 by referring to the free receiving buffer queue 213 in the reception DMA control portion 203. Subsequently, a packet is assembled. Then, the received packet is enqueued into the reception packet queue 211. Upon completion of assembling this packet, the processor (or software) 22 is informed of the reception of the packet.

The processor (or software) 22 informed of the reception of the packet determines the type of the packet enqueued in the reception packet queue 211 and performs higher protocol layer processing. In the case that the packet enqueued in the reception packet queue 211 becomes unnecessary, the processor (or software) 22 releases the receiving buffer as a free receiving buffer, and connects the free receiving buffer to the free receiving buffer queue 213. In the case that the packet is transmitted from the processor (or software) 22, a free transmitting buffer in the buffer memory 21 is allocated to the software. Then, the packet to be transmitted is connected to the transmission packet queue 212.

The transmitting DMA control portion 204 of the cell assembling/disassembling portion 20 reads from the buffer memory 21 the packet enqueued in the transmission packet queue 212 and then sends the read packet to the cell assembling portion 205. Subsequently, this cell assembling portion 205 assembles the received packet into an ATM cell. Thereafter, the portion 205 transmits an ATM-cellized packet to the logical channel designated by the software through the cell transmitting portion 206. At that time, in the case that there is no idle main circuit, the cell transmitting portion 206 restrains the transmission of cells according to the main circuit idle information sent from the hardware processing portion 1.

Referring next to FIGS. 7A, 7B, 8A, and 8B, there are illustrated operations of assembling packets and transmitting the packets from in the hardware processing portion 1 of the embodiment in the case that packets are transmitted from the software processing portion 2.

First, an operation of the hardware processing portion 1 in the case of transmitting a packet by designating a transmission destination logical channel from the software processing portion 2 is described hereinbelow.

As illustrated in FIGS. 7A and 7B, when receiving a packet transmitted from the software processing portion 2, the packet assembling portion 10 of the hardware processing portion 1 assembles a packet corresponding to each logical channel in the buffer memory 12. At that time, the packet assembling portion 10 does not transmit the packet header of a packet, whose transmission destination is preliminarily designated by the software processing portion 2, to the higher layer processing portion 11.

When the packet, whose transmission destination is preliminarily designated by the software processing portion 2, is put into a packet assembly completion state in the buffer memory 12, the packet determining/transmitting 13 distributes the packet sent from the software processing portion 2 to the packet transmission queue corresponding to the circuit, which is the designated transmission destination, and transmits the packet to the designated logical channel without waiting for the result of the processing in the higher layer processing portion 11. Incidentally, usually, the transmission destination designated by the software processing portion 2 is the main circuit 3. However, the packet may be looped back to the software processing portion 2 by designating the expansion circuit 4.

Figure 8B:
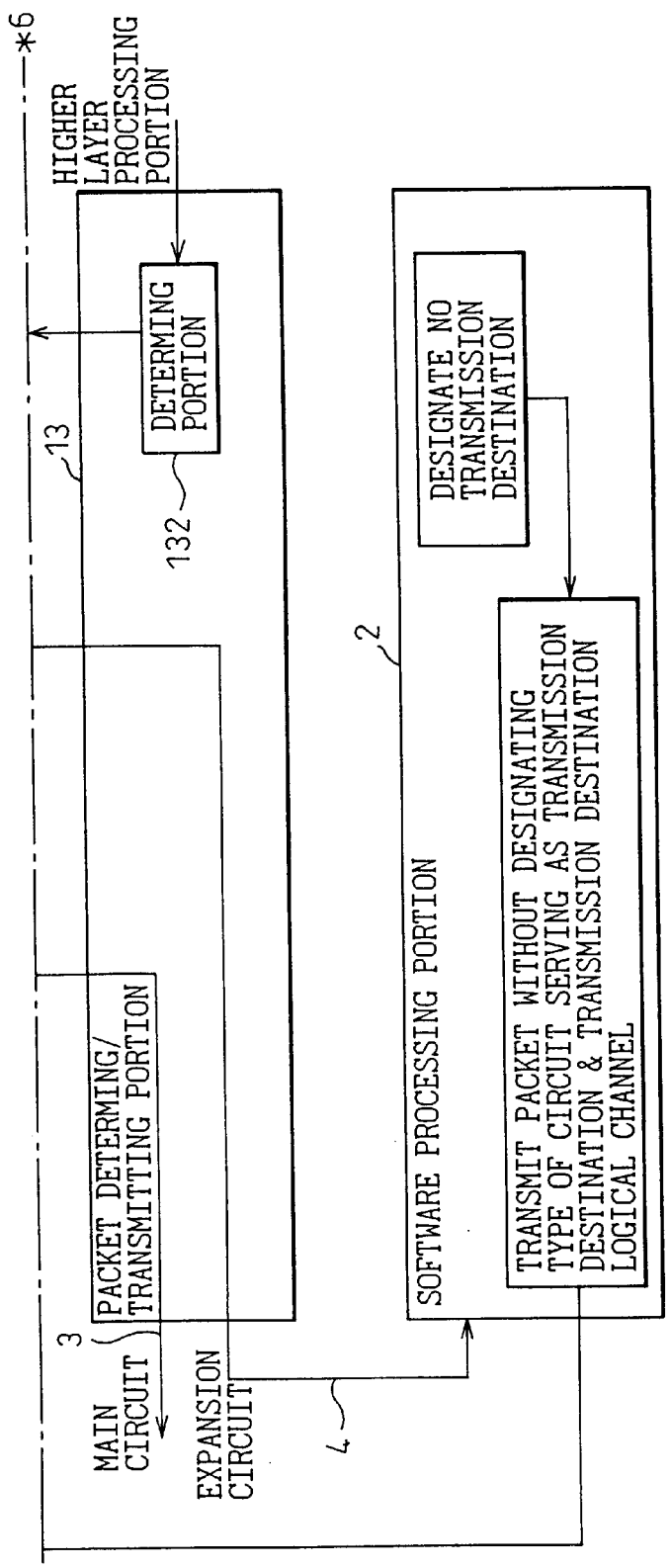

Next, an operation of the hardware processing portion 1 in the case of transmitting a packet without designating the transmission destination logical channel from the software processing portion 2 illustrated in FIGS. 8A and 8B is described hereinbelow.

As shown in FIGS. 8A and 8B, when receiving a packet transmitted from the software processing portion 2, the packet assembling portion 10 of the hardware processing portion 1 assembles a packet corresponding to each of the logical channels at the reception of the packet. At that time, regarding a packet whose transmission destination is not designated by the software, the packet assembling portion 10 transmits the packet header thereof to the higher layer processing portion 11, as in the case of the packet received from the main circuit 3.

The packet determining/transmitting portion 13 is brought into an assembly completion state upon completion of assembling the packet, whose transmission destination is designated by this software processing portion 2, and then waits for the result of the processing sent from the higher layer processing portion 11. Further, on condition that the portion 13 receives the result of the processing and that the assembling of a packet is completed, the portion 13 distributes the packet sent from the software processing portion 2 to the packet transmission queue corresponding to the circuit, which is a transmission destination, according to the received result of the processing. Then, the portion 13 transmits such a packet to the designated logical channel.

In this case that the software processing portion 2 transmits a packet, whose transmission destination is not designated by software, the hardware processing portion 1 performs transmission destination retrieval. Then, the packet is transmitted to a transmission destination obtained as a result of the retrieval. Consequently, the necessity for performing transmission destination retrieval by the software processing portion 2 is eliminated.

FIG. 9 illustrates a method of distributing packets, which are transmitted to the software processing portion 2, to logical channels correspondingly to each packet type by the hardware processing portion 1 in a modification of the aforementioned embodiment.

In the hardware processing portion 1, the higher layer processing portion 11 analyzes the received packet header and obtains the packet type identifier of the packet. The packet types are, for example, protocol packets, such as an ICMP packet, an IGMP packet, an OSPF packet, an RSVP packet, and a packet, whose destination is not obtained, and an invalid packet. These packet types (for instance, Packet Type #0 is a packet whose destination is not obtained) are classified by using corresponding logical channels. For example, Packet Type #0 is classified as corresponding to a logical channel CH1. Packet Type #1 is classified as corresponding to a logical channel CH1. Further, Packet Types #2 to #5 are classified as corresponding to a logical channel CH2.

In this embodiment, data representing the correspondence relation between the packet types and the transmission logical channels is preliminarily set in the determining portion 132. When receiving the result of the processing from the higher layer processing portion 11, the packet determining/transmitting portion 13 derives the transmission logical channel according to the packet type included in the result of the processing. Then, the portion 13 distributes the packet transmitted from the software processing portion 2 to the packet transmission queue corresponding to the derived logical channel. The portion 13 makes a decision on a branch in the software processing, based on the logical channel. Further, the portion 13 transmits a packet, which is required to undergo the software processing, to the software processing portion 2 through the expansion circuit 4 on the designated logical channel. According to the logical channel corresponding to the received packet, the software processing portion 2 determines the next processing to be performed. This eliminates the necessity for performing packet analysis processing in the portion 2, which processing is redundant in view of the packet analysis processing performed in the hardware processing portion 1.

FIG. 10 illustrates a method of attaching detail information, which is obtained by the result of the processing performed in the higher layer processing portion 11, to a packet to be transmitted to the software processing portion 2 in a modification of the embodiment illustrated in FIG. 9.

In the hardware processing portion 1, the determining portion 132 having received the result of the processing in the higher layer processing portion 11 attaches detail information to the leading cell of the packet. Alternatively, the portion 132 connects the detail information with the packet transmission queue corresponding to the packet. This packet detail information is, for instance, information on factors of packet invalidation, and protocol packet type codes. That is, the detail information represents more detailed classification of the packet type. The packet determining/transmitting portion 13 makes the decision on the branch in the software processing according to the detail information. A packet required to undergo the software processing is transmitted through the expansion circuit 4 to the software processing portion 2 by attaching this detail information to the packet. The software processing portion 2 determines the next processing, which is to be performed, according to the received detail information. Similarly as in the aforementioned case, the necessity for performing packet analysis processing in the portion 2, which processing is redundant in view of the packet analysis processing performed in the hardware processing portion 1, is eliminated. Thus, the software processing can be simplified still more. An improvement in the processing speed can be achieved.

Figure 11:
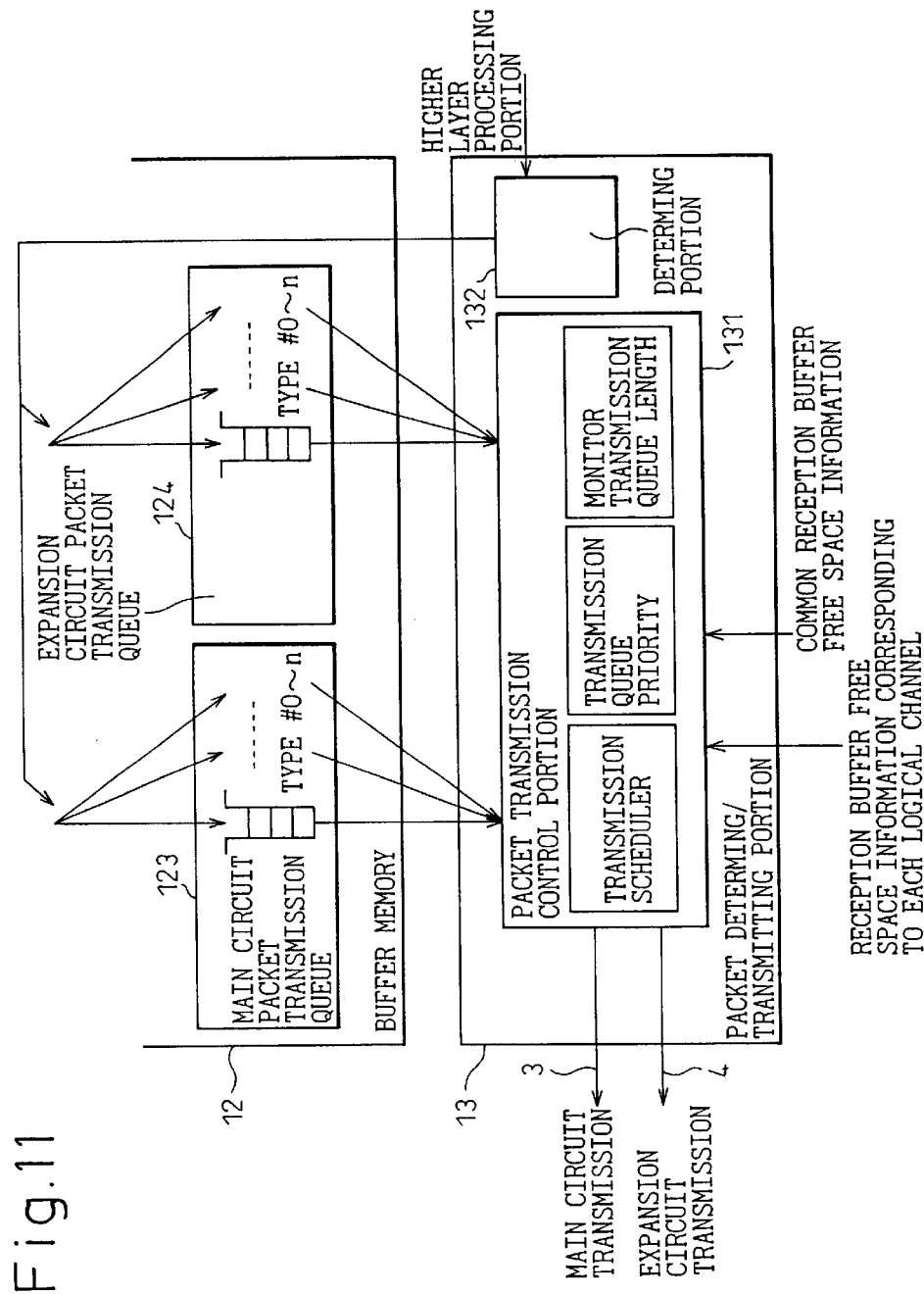
FIG. 11 is a diagram illustrating the case that a transmission queue is divided by the higher layer processing potion into parts thereof respectively corresponding to packet types.
Figure 12:
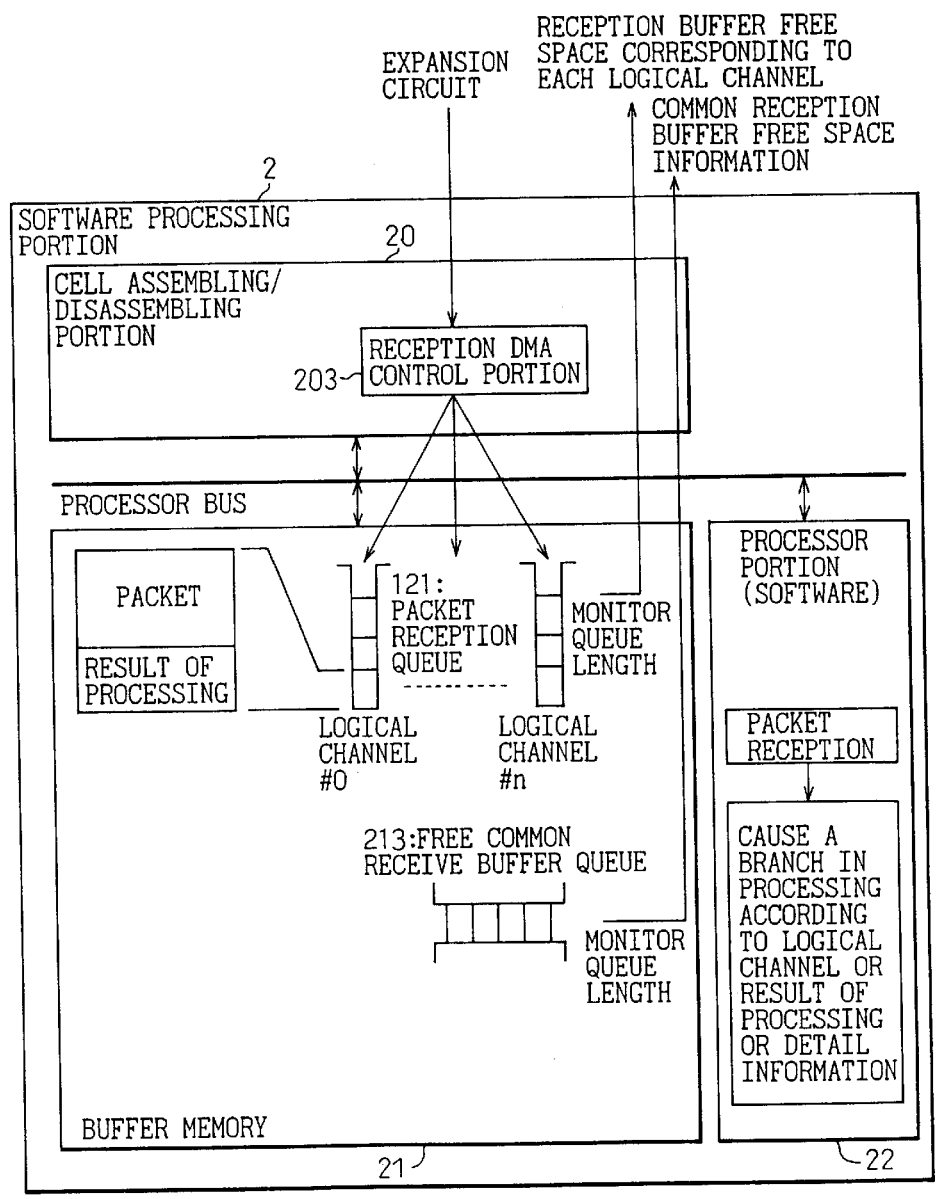
FIG. 12 is a diagram illustrating the software processing portion for outputting free buffer information.

Referring next to FIGS. 11 and 12, there is shown in another modification of the embodiment of the present invention, in which the software processing portion 2 notifies the hardware processing portion 1 of a free space condition of the own receiving buffer, so that the hardware processing portion 1 transmits ATM-cellized packet to the software processing portion 2 according to the free space condition.

In this case, first, the constitution illustrated in FIG. 12 is described hereinbelow. FIG. 12 is a diagram illustrating the constitution of the software processing portion 2 for outputting the free buffer information. The buffer is allocated according to a common free receiving buffer queue, which is common to the logical channels, to the cell assembling/disassembling portion 20 having received a packet from the expansion circuit 4. Thus, the portion 20 is adapted in such a manner as to transfer a packet to the packet receiving queue corresponding to the logical channel. Incidentally, the cell assembling/disassembling portion 20 compares the queue length of the common free receiving buffer queue with the preset queue length. Then, the portion 20 outputs common receiving buffer free space information indicating whether or not the queue length of the common free receiving buffer queue is less than or equal to the preset queue length. Moreover, the portions 20 transmits this information to the hardware processing portion 1. Furthermore, the cell assembling/disassembling portion 20 compares the queue length of the packet receiving queue, which corresponds to each of the logical channels, with the preset queue length corresponding to each of the logical channels, and outputs reception buffer free space information that corresponds to each of the logical channels and that indicates whether or not the queue length of each of the packet receiving queues is less than or equal to the preset queue length. Incidentally, a branch is caused according to the detail information on the logical channel (thus, the packet type) or on the result of the higher layer processing in the packet receiving operation of the processor (or software) 22 to be performed by this software processing portion 2.

The hardware processing portion 1 illustrated in FIG. 11 is constituted in such a way as to perform the transmission scheduling according to the reception buffer free space information received form the software processing portion shown in FIG. 12. This hardware processing portion 1 is also constituted in such a manner as to perform the transmission scheduling by dividing the packet transmission queue into parts respectively corresponding to the packet types.

As shown in FIG. 11, when the determining portion 132 receives the result of the processing from the higher layer processing portion 11, this portion 132 distributes the packet (or the ATM-cellized packet) to the corresponding packet transmission queue according to the packet type represented by the result of the processing. The packet transmitting portion 133 performs the transmission scheduling on packets, which are to be transmitted and are enqueued in the transmission queue, according to the preset priority corresponding to each transmission queue (thus, corresponding to each packet type). Then, the packet transmitting portion 133 reads the packet from the transmission queue according to the transmission schedule, and transmits the read packet to the circuit. The packet transmission queues divided correspondingly to each of the packet types are further divided into a transmission queue for packets to be transmitted to the main circuit, and another transmission queue for packets to be transmitted to the expansion circuit. Furthermore, the scheduling of the transmission of packets from the main circuit is performed independent of the scheduling of the transmission of packets from the expansion circuit. Incidentally, in the case of employing a method of multiplexing and demultiplexing the packets transmitted to or from the main circuit and the expansion circuit, as illustrated in FIGS. 5A and 5B, the scheduling is performed on all the packets enqueued in the transmission queue corresponding to the main circuit and the packets enqueued in the transmission queue corresponding to the expansion circuit.

Thus, this hardware processing portion 1 divides the transmission queue for transmitting packets to the main circuit 3 correspondingly to each of the packet types into a plurality of parts, and similarly divides the transmission queue for transmitting packets to the expansion circuit 4 correspondingly to each of the packet types into a plurality of parts. The hardware processing portion 1 performs the transmission scheduling among the packets, which are transmitted to the main circuit 3 and enqueued in the transmission queues 123 corresponding to the packet types, or among the packets, which are transmitted to the expansion circuit 4 and enqueued in the transmission queues 124 corresponding to the packet types, or among all the packets enqueued in the transmission queues 123 and 124. Consequently, the priority can be set correspondingly to each of the packet types. Thus, the software processing portion 2 can preferentially receive the packet of a high priority.

Further, the packet transmitting portion 133 monitors the common receiving buffer free space information from the software processing portion 2 at a transmission queue length monitoring portion. When it is detected that there is no free space in the common receiving buffer of the software processing portion 2, the reading of a packet from the transmission queue 124 of the buffer memory 12 for packets transmitted to the expansion circuit 4 is suppressed. Thus, the software processing portion 2 prevents the packet loss of the ATM-cellized packets from occurring owing to the overflow of the common receiving buffer in the hardware processing portion 1.

Furthermore, in the case that there is no free space in the reception buffer corresponding to a certain logical channel in the software processing portion 2, the packet transmitting portion 133 of the hardware processing portion 1 is informed of this fact by using the reception buffer free space information corresponding to the logical channel. Thus, the packet transmitting portion 133 restrains only the reading of a packet enqueued in the transmission queue, which corresponds to the certain logical channel, for packets to be transmitted to the expansion circuit.

Thus, in this packet transfer system, the software processing portion 2 monitors the congestion state of the buffer memory 21 in the software processing portion. When a congestion state occurs in the common receiving buffer, the system causes the hardware processing portion 1 to wait for a transmission of a packet enqueued in the transmission queue 124 for packets to be transmitted to the expansion circuit 4. Further, a packet of a low priority, undergoing software processing, is prevented from being transmitted to the software processing portion 2. Consequently, an overflow is prevented from occurring in the buffer in the software processing portion 2. This eliminates the need for performing a congestion control operation by software in the software processing portion 2.

Incidentally, the packet transfer system according to the modification of the embodiment can perform the transmission scheduling according to all the priorities preset corresponding to each of the transmission queues and the common receiving buffer free space information in the software processing portion. For example, in the case that a packet enqueued in the transmission queue of a high priority at the side of the hardware processing portion 1 cannot be transmitted because there is no free space in the receiving buffer at the side of the software processing portion 2, flexible transmission scheduling can be achieved, for instance, a packet enqueued in another transmission queue, the packet dequeued from which can be transmitted, is preferentially transmitted. Incidentally, the expression "packet types" used herein means the protocol types and the combination thereof.

Figure 13:
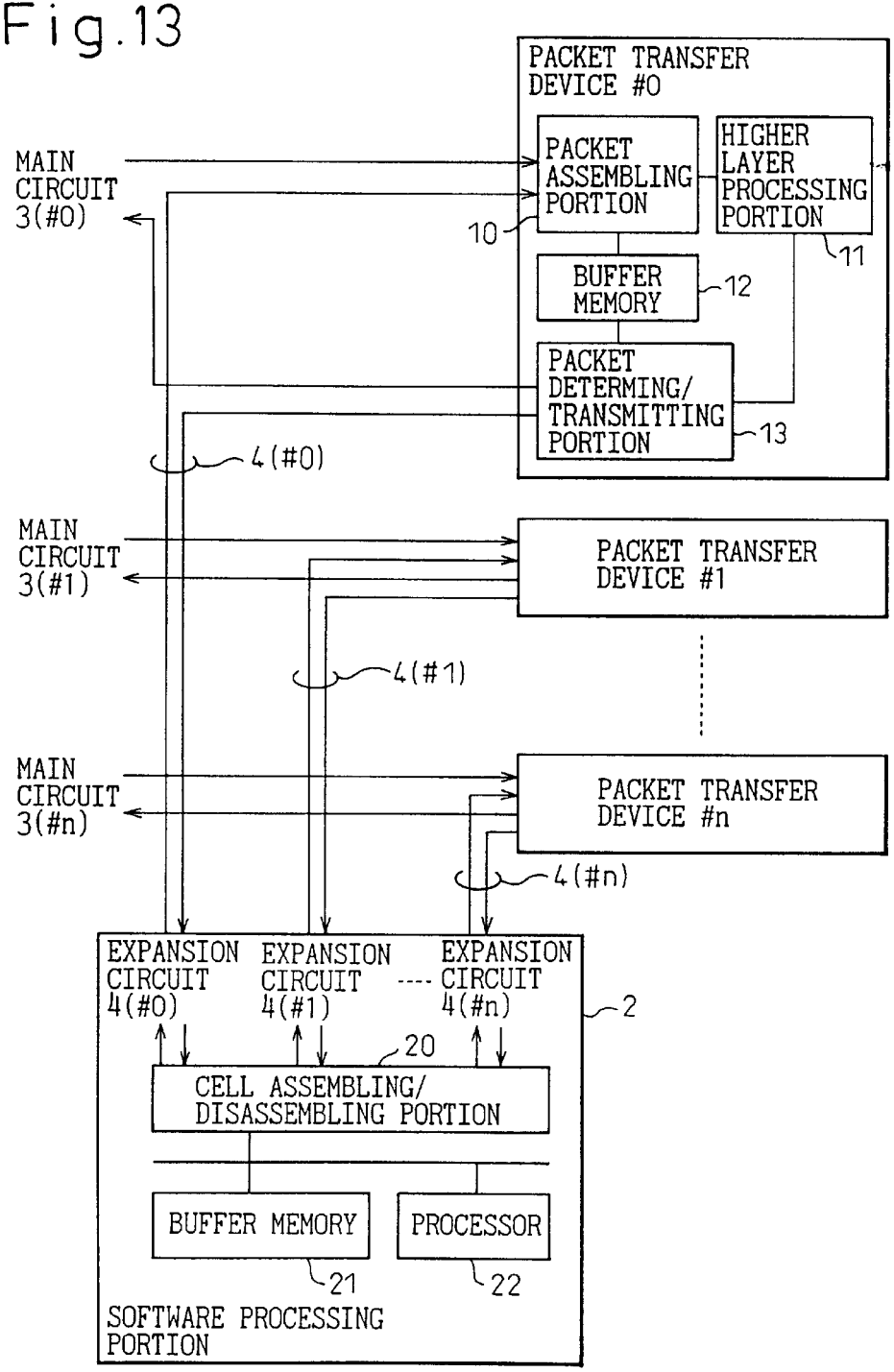
FIG. 13 is a diagram illustrating the constitution of another embodiment obtained by connecting a single software processing portion to a plurality of packet transfer systems.

FIG. 13 illustrates another embodiment, namely, another packet transfer system according to the present invention. This embodiment is constituted so that a plurality of packet transfer apparatuses are connected to a single software processing portion.

As shown in FIG. 13, the system is provided with a plurality of packet transfer devices #0–#n, each of which is constituted by the hardware processing portion 1 of each of the aforementioned embodiments. Further, each of the expansion circuits 4(#0)–4(#n) of the packet transfer devices #0–#n is connected to a common and single software processing portion 2. The cell assembling/disassembling portion 20 accommodates a plurality of expansion circuits 4(#0)–4(#n), among which the packet transmission and the packet reception can be performed independent of one another. Furthermore, the processor 22 (or software) is used in common for performing packet transmitting operations of transmitting packets to a plurality of packet transfer devices #0–#n, or packet receiving operations of receiving packets from a plurality of packet transfer devices #0–#n.

Figure 14A:
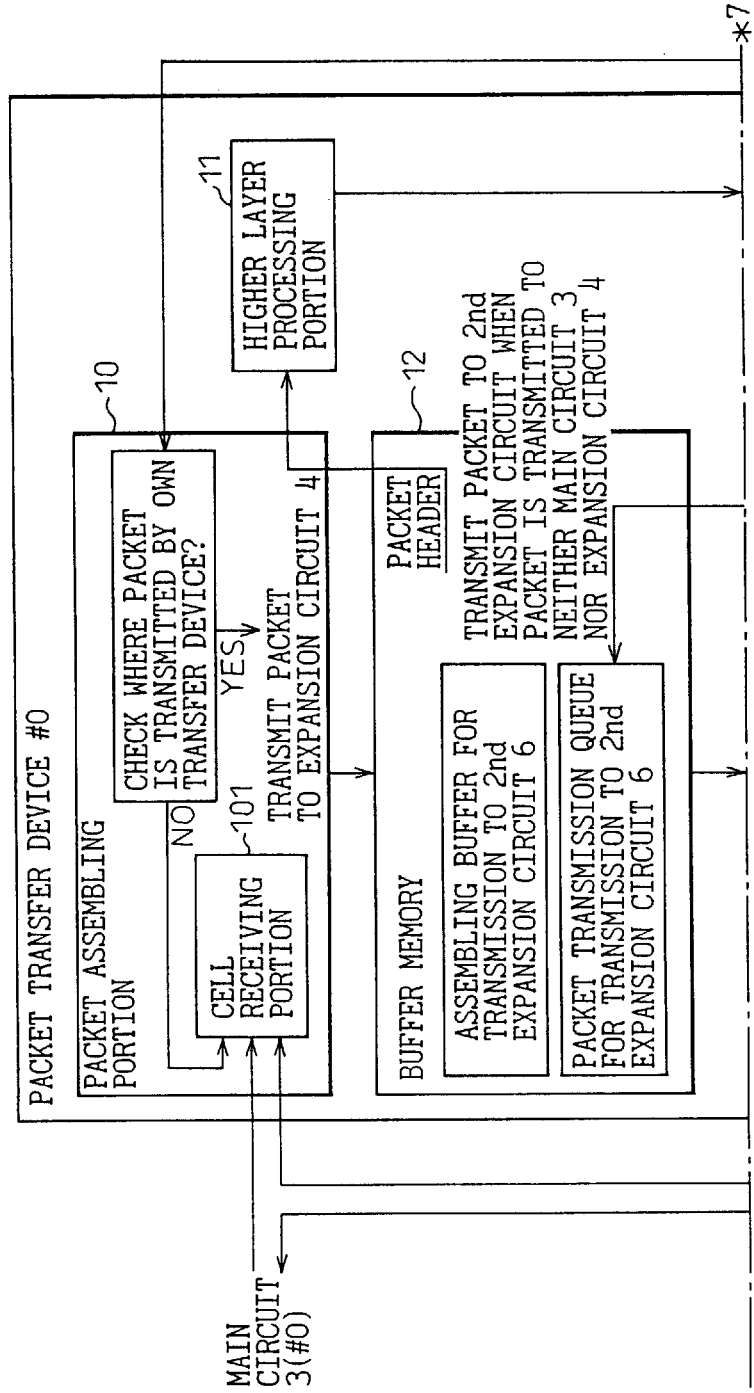
FIGS. 14A and 14B are diagrams illustrating the constitution of still another embodiment obtained by connecting a single software processing portion to a plurality of packet transfer systems.
Figure 14B:
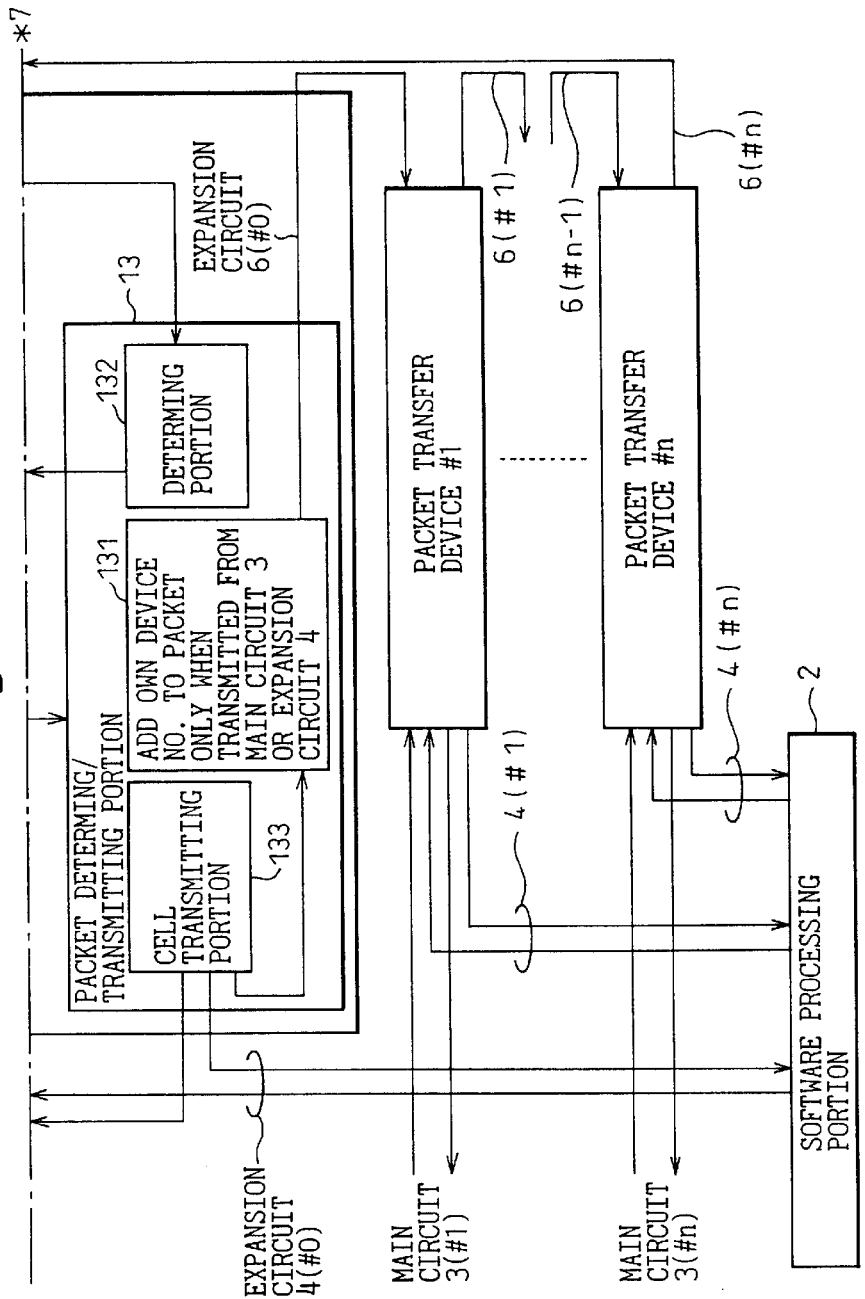

FIGS. 14A and 14B illustrate an improvement of the embodiment illustrated in FIG. 13.

In this embodiment, each of the packet transfer device #0–#n is provided with a corresponding one of the second expansion circuits 6(#0)–6(#n). The packet transfer devices #0–#n are arranged in a ring-like manner by being connected by using these expansion circuits 6(#0)–6(#n). Further, in each of the packet transfer devices #0–#n, the packet assembling portion 10 is adapted to have the function of assembling the ATM-cellized packet, which is received from the expansion circuit connected to the packet transfer device at the precedent stage, into a packet, and the function of transmitting the packet header to the higher layer processing portion 11. Furthermore, the packet determining/transmitting portion 13 is adapted to have the function of suitably transmitting a packet to the packet transfer device at the subsequent stage through the expansion circuit 6 according to a result of higher layer processing.

The function of the second expansion circuits 6 is the same as that of the main circuit 3 and the (first) expansion circuit 4. Therefore, packets received from the main circuit 3 and the expansion circuit 4 can be transmitted to the packet transfer device at the subsequent stage. Furthermore, packets received from the expansion circuits 6 of the packet transfer device at the precedent stage can be transmitted to the main circuit 3 or the expansion circuit 4. Thus, in the case that a plurality of packet transfer devices #0–#n are provided in the system, that the expansion circuit 6 at the transmission side is connected to the expansion circuit 6 at the reception side of the packet transfer device at the subsequent stage, and that a result of the higher layer processing portion 11 of the own packet transfer device indicates neither the transmission of a corresponding packet (namely, an ATM-cellized packet) to the main circuit 3 of the own packet transfer device nor the transmission of the corresponding packet to the expansion circuit 4, this packet is transmitted to the packet transfer device at the subsequent stage.

When the packet transfer device at the subsequent stage receiving the packet from the reception-side expansion circuit 6, the packet header is transferred to the higher layer processing portion 11. Then, the higher layer processing is performed by the portion 11. Subsequently, in the case that a result of the higher layer processing indicates the transmission of a packet to the main circuit 3 or to the expansion circuit 4, the packet is transmitted to such a circuit. Otherwise, the packet is transmitted to the packet transfer device at a further subsequent stage by using the second expansion circuit, similarly as in the case of the packet transfer device at the precedent stage. Incidentally, the packet transfer device for transmitting a packet received from the main circuit 3 or from the expansion circuit 4, that is, the starting packet transfer device, which initially starts the transmission of a packet to the expansion circuit, adds starting packet transfer device information, which represents this packet transfer system, to the packet to be transmitted. On the other hand, when the packet transfer device receives this packet from the expansion circuit 6, this transfer device checks the information, which is added to the received packet and indicates the transfer device starting the transfer of the packet to the expansion circuit 6. In the case that this information does not indicate the transfer device itself checking this information, this packet is transmitted to the packet transfer device at the subsequent stage without changing the starting packet transfer device information. Conversely, in the case that this information indicates the transfer device itself checking this information, this packet is transmitted to the software processing portion 2 by using the expansion circuit 4.

FIG. 15 schematically illustrates an example of the aforementioned operation.

As illustrated in FIG. 15, when the packet transfer device #0 receives a packet from the main circuit 3, the transmission destination of the packet is not obtained by the higher layer processing. Thus, an own packet transfer device number #0 is added to the packet. Then, this packet is transferred to the packet transfer device #1 by using the second expansion circuit 6. Further, even in the packet transfer device #1, which receives the transferred packet, the transmission destination is not obtained. Thus, this packet transfer device #1 transfers this packet to the packet transfer device #2 at a further subsequent stage by using the second expansion circuit 6. At that time, the information, which is added to the packet to be transferred and represents that the packet transfer device has started transferring the packet, still indicates #0. Thus, when a result of the higher layer processing is the transmission of a packet to the main circuit #3 in the packet transfer device #k, which receives the transferred packet, this packet is transmitted to the main circuit 3 of the packet transfer device #k.

Meanwhile, a packet, whose transmission destination cannot be obtained by the higher layer processing in all the packet transfer devices #0 to #n, is transferred around a ring of these packet transfer devices connected by the expansion circuit 6. Thus, this packet comes back to the starting packet transfer device #0 that starts the transmission thereof to the expansion circuit 6. The starting packet transfer device #0 checks the starting packet transfer device information and thus recognizes that the transmission of this packet to the expansion circuit 6 is started by the own packet transfer device itself. Then, this packet is transmitted to the software processing portion 2 of this starting packet transfer device #0. This processing prevents the packet, which is transferred on the expansion circuit 6 among the packet transfer devices #0 to #n, from being led into an endless loop.

As described above, according to the present invention, packets, which are required to undergo software processing, are distributed to the circuits directed to the software processing portion. Further, packets transmitted by the software processing portion are multiplexed and transmitted. Thus, the buffer memory for the packet transfer implemented by the hardware processing portion, and the buffer memory for the packet transfer implemented by the software processing portion can be separated from each other. Consequently, there is provided a coupling system in which the packet transfer process implemented by the hardware processing portion and the packet transfer process implemented by the software processing portion do not affect each other. The hardware processing portion and the software processing portion can make full use of capabilities thereof.

Moreover, this facilitates the determination of the packet types in a software receiving processing. Furthermore, this eliminates the necessity for transmission destination retrieval in a software transmitting process. Consequently, the packet processing throughput of the software processing portion is enhanced.

Furthermore, a plurality of packet transfer devices of the system enable coupling for transmission destination retrieval. Consequently, the processing capacity of a packet transfer system can be increased.

Although the preferred embodiments of the present invention have been described above, it should be understood that the present invention is not limited thereto and that other modifications will be apparent to those skilled in the art without departing from the sprint of the invention.

The scope of the present invention, therefore, should be determined solely by the appended claims.

What is claimed is:

1. A packet transfer system comprising:
   a hardware processing portion having:
   a memory;
   a packet assembling portion for causing said memory to store a packet assembled from an ATM cell received from a main circuit or an expansion circuit;
   a higher layer processing portion for performing higher layer processing portion according to header information sent from said packet assembling portion; and
   a packet determining/transmitting portion for transmitting a packet, which is determined according to a result of the higher layer processing in said higher layer processing portion as required to undergo packet processing, to said expansion circuit and for transmitting a packet, which is determined according to the result of the higher layer processing as not required to undergo packet processing, in a form of an ATM cell to a main circuit.

2. The packet transfer system according to claim 1, which further comprises a software processing portion having:
   a second memory;
   a cell assembling/disassembling portion for assembling the ATM cell received from said expansion circuit into a packet, for causing said second memory to store the assembled packet, for reading the packet stored in said second memory and for transmitting the read packet in the form of an ATM cell to said expansion circuit;
   a packet processing portion for performing packet processing on a packet, which is received in said second memory, by software.

3. The packet transfer system according to claim 1, wherein said packet assembling portion of said hardware processing portion includes:
   a cell receiving portion for receiving an ATM cell from said main circuit or said expansion circuit;
   a packet assembly control portion having a function of assembling a logically multiplexed packet, into which an ATM cell received from said main circuit is assembled, and a logically multiplexed packet, into which an ATM cell received from said expansion circuit is assembled, into a packet corresponding to each logical channel and for storing the assembled packet in said memory; and
   a header transmitting portion for transmitting a packet header, which consists of one cell or two or more cells, to said higher layer processing portion upon completion of assembling the packet or upon completion of assembling a packet header.

4. The packet transfer system according to claim 1, wherein said packet determining/transmitting portion includes:
   a determining portion for distributing packets according to a result of higher layer processing, which is sent from said higher layer processing portion, to a transmission queue for said main circuit or to a transmission queue for said expansion circuit upon completion of assembling a packet in said memory and of receiving the result of the higher layer processing from said higher layer processing portion; and a transmitting portion for transmitting a packet, which is dequeued from the transmission queue, to a transmission destination logical channel according to the result of layer processing.

5. The packet transfer system according to claim 3, wherein said cell receiving portion of said packet assembling portion has a function of multiplexing an ATM cell received from said main circuit and an ATM cell received from said expansion circuit, wherein said cell receiving portion is adapted to receive an ATM cell from the expansion circuit only when said main circuit idle information, which indicates that no ATM cell is received, is outputted from said main circuit and no ATM cell is received from said main circuit, said packet assembly control portion of said packet assembling portion has a function of preventing an access to a memory region for said main circuit and an access to a memory region for said expansion circuit from simultaneously occurring when a packet is assembled, and wherein said packet determining/transmitting portion has a function of preventing an access to a memory region for said main circuit and an access to a memory region for said expansion circuit from simultaneously occurring when a packet is transmitted, and a function of dividing ATM cells, which are to be transmitted, into ATM cells to be transmitted to said main circuit, and ATM cells to be transmitted to said expansion circuit.

6. The packet transfer system according to claim 2, wherein said cell assembling/disassembling portion of said software processing portion is configured in such a manner as to transfer a packet, which is obtained from an ATM cell received from said expansion circuit, to said second memory and as to transmit a packet, which is stored in said second memory, in a form of an ATM cell to said expansion circuit, and wherein said software processing portion performs a packet receiving process on a packet, which is transferred to said second memory and required to perform packet processing by software, by using said second memory, and transmits a packet, on which a packet transmitting process by software is performed by using said second memory, to said hardware processing portion through said expansion circuit.

7. The packet transfer system according to claim 2, wherein said software processing portion has a function of preliminarily designating said main circuit or said expansion circuit as a circuit corresponding to a destination when a packet is transmitted to said hardware processing portion through said expansion circuit, and for transmitting a packet, whose destination logical channel is designated, and wherein said hardware processing portion has a function of preventing said packet assembling portion from transmitting a packet header, whose destination is designated, received through said expansion circuit to said higher layer processing portion, and a function of causing said packet determining/transmitting portion to distributing packets to a transmission queue corresponding to a transmitting circuit designated by software without waiting for a result of the higher layer processing upon completion of assembling the packets and for transmitting a packet to the designated logical channel.

8. The packet transfer system according to claim 2, wherein said software processing portion has a function of transmitting a packet without designating transmission destination information by software when a packet is transmitted to said hardware processing portion to said expansion circuit, and wherein said hardware processing portion has a function of causing, when receiving a packet whose transmission destination is not designated, said packet assembling portion to transmit a packet header of the packet to said higher layer processing portion, and for then causing said packet determining/transmitting portion to transmit a packet to a transmission destination circuit and a transmission destination logical channel according to a result of the higher layer processing upon completion of assembling the packet.

9. The packet transfer system according to claim 2, wherein said packet transmitting portion of said hardware processing portion has a function of determining, when a packet obtained as a result of the higher layer processing is required to undergo packet processing performed by using software, a packet type of the packet and for distributing the packet to a transmitting logical channel corresponding to the packet type, and a function of performing decision on a branch on software processing according to the transmitting logical channel, and wherein said cell assembling/disassembling portion of said software processing portion has a function of distributing the received packet from said hardware processing portion to a receiving queue corresponding to each logical channel.

10. The packet transfer system according to claim 2, wherein said packet determining/transmitting portion of said hardware processing portion has a function of adding, when a result of the higher layer processing is a packet requiring the packet processing, detail information on a result of the higher layer processing to the packet, and also has a function of performing making a decision on a branch in the software processing according to the detail information, and wherein said cell assembling portion of said software processing portion has a function of transferring a packet to which the detail information from said hardware processing portion is added.

11. The packet transfer system according to claim 1, wherein said packet determining/transmitting portion of said hardware processing portion has a function of determining, when a packet obtained as a result of the higher layer processing is required to undergo packet processing, a packet type of the packet and for separating the packet into a packet transmission queue corresponding to the packet type and to said expansion circuit.

12. The packet transfer system according to claim 1, wherein said packet determining/transmitting portion of said hardware processing portion has a function of determining, when a packet obtained as a result of the higher layer processing is to be transmitted to said main circuit, a packet type of the packet and for separating the packet into a packet transmission queue corresponding to the packet type and to said main circuit.

13. The packet transfer system according to claim 11, wherein said packet determining/transmitting portion has a function of scheduling, when packets waiting for transmission are enqueued into a plurality of transmission queues, transmission of packets from said main circuit and transmission of packets from said expansion circuit independently of each other according to information on preset priority of each of the transmission queues or for scheduling transmission of packets from said main circuit and said expansion circuit.

14. The packet transfer system according to claim 2, wherein said software processing portion has a function of monitoring a length of a queue corresponding to a common receiving buffer of said second memory and for notifying said hardware processing portion of information on free space of said common receiving buffer, and wherein said packet determining/transmitting portion of said hardware processing portion has a function of transmitting a packet only when a common receiving buffer of said second memory of said software processing portion has free space.

15. The packet transfer system according to claim 2, wherein said software processing portion has a function of monitoring a length of a used part of a packet receiving queue corresponding to each logical channel of said second memory and for notifying said hardware processing portion of information on free space of a receiving buffer corresponding to each logical channel, and wherein said packet determining/transmitting portion of said hardware processing portion has a function of transmitting a packet dequeued from a packet transmission queue corresponding to a logical channel that corresponds to said receiving buffer, which has free space, of said second memory.

16. The packet transfer system according to claim 14, wherein said packet determining/transmitting portion has a function of scheduling transmission of a packet according to both information on preset priority of each transmission queue and information on free space of said receiving buffer, which is sent from said software processing portion, and also has a function of transmitting a packet dequeued from the transmission queue that corresponds to the receiving buffer, which has free space, of said software processing portion.

17. A packet transfer system comprising:

a plurality of packet transfer devices each including:

a hardware processing portions that has:

a first memory;

a packet assembling portion for causing said first memory to store a packet assembled from an ATM cell received from a main circuit or a first expansion circuit;

a higher layer processing portion for performing higher layer processing according to header information sent from said packet assembling portion; and a packet determining/transmitting portion for transmitting a packet, which is determined according to a result of the higher layer processing in said higher layer processing portion as required to undergo packet processing, to an expansion circuit and for transmitting a packet, which is determined according to the result of the higher layer processing as not required to undergo packet processing, in a form of an ATM cell to a main circuit, and a software processing portion having:

a second memory;

a cell assembling/disassembling portion for assembling the ATM cell received from said expansion circuit into a packet, for causing said second memory to store the assembled packet, for reading the packet stored in said second memory and for transmitting the read packet in the form of an ATM cell to said expansion circuit; and a packet processing portion for performing packet processing on a packet, which is received in said second memory, by software, wherein said software processing portion is constituted in such a manner as to accommodate a plurality of expansion circuits, wherein expansion circuits of the plurality of packet transfer devices are connected to said software processing portion, wherein said software processing portion performs a packet receiving process of receiving a packet from each of said plurality of packet transfer devices, and a packet transmitting process of transmitting a packet to each of said plurality of packet transfer devices.

18. The packet transfer apparatus according to claim 17, wherein said packet assembling portion of each of said hardware processing portions has a function, provided correspondingly to each of said main circuit, said expansion circuit, and a second expansion circuit, of assembling a packet corresponding to each logical channel, and a function, provided correspondingly to each of said main circuit, said expansion circuit, and said second expansion circuit, of transmitting a packet header to said higher layer processing portion, and wherein said packet determining/transmitting portion of each of said hardware processing portions has a function of distributing packets to transmission queues respectively corresponding to said main circuit, said first expansion circuit, and said second expansion circuit, and also has a function of distributing a packet to a packet transmission queue corresponding to said second expansion circuit when the packet obtained as a result of the higher layer processing is transmitted neither to said main circuit nor to said first expansion circuit, and a function of transmitting a packet according to a result of higher layer processing performed in another of said packet transfer devices, said system further having a function of connecting a transmitting-side one of said second expansion circuits of one of said packet transfer devices to a receiving-side one of said second expansion circuits of another of said packet transfer devices.

19. The packet transfer apparatus according to claim 18, wherein said packet determining/transmitting portion of each of said hardware processing portions has a function of adding, only when a packet received from said main circuit or said first expansion circuit is transmitted to said second expansion circuit, information to said second expansion circuit, which information indicates that said packet transfer device, to which said packet determining/transmitting portion itself belongs, starts to transfer the packet to said second expansion circuit, wherein said packet assembling portion of each of said hardware processing portions has a function of checking whether or not a packet received from said second expansion circuit is generated by said packet transfer device, to which said hardware processing portion itself belongs, and for transmitting, when it is ascertained that the packet is generated by said packet transfer device to which said hardware processing portion itself belongs, the packet to said first expansion circuit without transmitting the packet header to said higher layer processing portion, and wherein when no instructions to transmit a packet, which is received from said main circuit or said first expansion circuit, to said main circuit or said first expansion circuit are obtained by the higher layer processing, the packet is transmitted to said software processing portion.

\* \* \* \* \*